US009843428B2

(12) United States Patent
Ma et al.

(10) Patent No.: US 9,843,428 B2
(45) Date of Patent: *Dec. 12, 2017

(54) METHODS AND SYSTEMS FOR ORTHOGONAL FREQUENCY DIVISION MULTIPLEXING (OFDM) MULTIPLE ZONE PARTITIONING

(71) Applicant: Apple Inc., Cupertino, CA (US)

(72) Inventors: Jianglei Ma, Kanata (CA); Ming Jia, Ottawa (CA); Wen Tong, Ottawa (CA); Peiying Zhu, Kanata (CA); Hang Zhang, Nepean (CA); Mo-Han Fong, L'Original (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,202

(22) Filed: Mar. 20, 2017

(65) Prior Publication Data
US 2017/0195097 A1 Jul. 6, 2017

Related U.S. Application Data

(63) Continuation of application No. 15/143,712, filed on May 2, 2016, now Pat. No. 9,621,390, which is a (Continued)

(51) Int. Cl.
H04K 1/10 (2006.01)
H04L 5/00 (2006.01)
H04L 27/26 (2006.01)

(52) U.S. Cl.
CPC ............ *H04L 5/0051* (2013.01); *H04L 5/005* (2013.01); *H04L 5/0007* (2013.01); *H04L 27/2613* (2013.01)

(58) Field of Classification Search
CPC ... H04L 5/0007; H04L 27/2613; H04L 5/005; H04L 5/0051
(Continued)

(56) References Cited

U.S. PATENT DOCUMENTS 5,867,478 A 2/1999 Baum et al.
6,141,393 A 10/2000 Thomas et al.
(Continued)

FOREIGN PATENT DOCUMENTS

EP 1898542 3/2008
WO 03/034642 3/2003
(Continued)

OTHER PUBLICATIONS

Mino et al., "Winner II intramode and intermode cooperation schemes definition", IST-4-027756 Winner II D4.8.1 [online], Jun. 30, 2006, retrieved from https://www.ist-winner.org/WINNER2-Deliverables/D4.8.1_vI.O.pdf on Nov. 15, 2006.
(Continued)

*Primary Examiner* — Juan A Torres
(74) *Attorney, Agent, or Firm* — Meyertons, Hood, Kivlin, Kowert & Goetzel, P.C.

(57) ABSTRACT

Aspects of the invention include methods and devices for inserting data and pilot symbols into Orthogonal Frequency Division Multiplexing (OFDM) frames having a time domain and a frequency domain. A method involves inserting in at least one zone of a first type a two dimensional array of data and pilot symbols in time and frequency and inserting in at least one zone of a second type a two dimensional array of data and pilot symbols in time and frequency. In some implementations the zone of the first type comprises common pilot symbols that can be detected by all receivers receiving the OFDM frame. In some implementations the zone of the second type comprises dedicated pilot symbols
(Continued)

that are only detectable by a receiver that is aware of pre-processing used to encode the dedicated pilot symbols.

18 Claims, 12 Drawing Sheets

Related U.S. Application Data continuation of application No. 14/458,131, filed on Aug. 12, 2014, now Pat. No. 9,331,880, which is a continuation of application No. 13/944,010, filed on Jul. 17, 2013, now Pat. No. 8,811,544, which is a continuation of application No. 13/292,643, filed on Nov. 9, 2011, now Pat. No. 8,542,771, which is a continuation of application No. 12/064,563, filed as application No. PCT/CA2006/001383 on Aug. 23, 2006, now Pat. No. 8,073,063.

(60) Provisional application No. 60/710,527, filed on Aug. 23, 2005.

(58) Field of Classification Search
USPC .......................................... 375/260; 455/59
See application file for complete search history.

(56) References Cited

U.S. PATENT DOCUMENTS

| | | |
|---|---|---|
| 6,597,729 B1 | 7/2003 | Schmidl et al. |
| 6,654,429 B1 | 11/2003 | Li |
| 6,834,046 B1 | 12/2004 | Hosur et al. |
| 7,313,086 B2 | 12/2007 | Aizawa |
| 7,436,757 B1 | 10/2008 | Wilson et al. |
| 7,751,510 B2 | 7/2010 | Budianu et al. |
| 7,830,976 B2 | 11/2010 | Gorokhov et al. |
| 8,027,243 B2 | 9/2011 | Jin et al. |
| 2003/0072254 A1 | 4/2003 | Ma et al. |
| 2003/0072255 A1 | 4/2003 | Ma et al. |
| 2003/0072395 A1 | 4/2003 | Jia et al. |
| 2004/0001429 A1 | 1/2004 | Ma et al. |
| 2004/0062191 A1 | 4/2004 | Lacroix-Penther et al. |
| 2004/0081073 A1 | 4/2004 | Walton et al. |
| 2004/0085946 A1 | 5/2004 | Morita et al. |
| 2004/0218682 A1 | 11/2004 | Nam et al. |
| 2004/0246998 A1 | 12/2004 | Ma et al. |
| 2005/0084042 A1 | 4/2005 | Van Houtum |
| 2005/0163194 A1 | 7/2005 | Gore et al. |
| 2005/0163238 A1 | 7/2005 | Fujii |
| 2005/0202822 A1 | 9/2005 | Park et al. |
| 2006/0046734 A1 | 3/2006 | Costa et al. |
| 2006/0067416 A1 | 3/2006 | Tirkkonen et al. |
| 2007/0041456 A1 | 2/2007 | Jahan et al. |
| 2007/0064669 A1 | 3/2007 | Classon et al. |
| 2007/0258404 A1 | 11/2007 | Tirkkonen et al. |
| 2008/0253279 A1 | 10/2008 | Ma et al. |
| 2009/0225885 A1 | 9/2009 | Aoki et al. |

FOREIGN PATENT DOCUMENTS

| | | |
|---|---|---|
| WO | 2004/049618 | 6/2004 |
| WO | 2005/057870 | 6/2005 |
| WO | 2005/088882 | 9/2005 |
| WO | 2005/125044 | 12/2005 |
| WO | 2006/034577 | 4/2006 |

OTHER PUBLICATIONS

GPP TR 25.814 v0.1.1 "3rd Generation Partnership Project; Technical Specification Group Radio Access Network; Physical Layer Aspects for Evolved UTRA (Release 7)" (Jun. 2005).
International Search Report in corresponding Application No. PCT/CA2006/001380, dated Nov. 24, 2006, pp. 1-4.
International Search Report in corresponding Application No. PCT/CA2006/001595, dated Jan. 19, 2007, pp. 2-5.
Non-Final Office Action in corresponding Application No. 111992,737, dated Jan. 3, 2012, pp. 1-11.
Final Office Action in corresponding Application No. 111992,737, dated Oct. 24, 2012, pp. 1-13.
Non-Final Office Action in corresponding U.S. Appl. No. 12/064,566, dated Mar. 24, 2011, pp. 1-9.
Communication in EP Application No. 08 075 282.7-2415, dated Jul. 1, 2010, pp. 1-4.
"Physical Channel Concept for Scalable Bandwidth in Evolved UTRA Downlink;" NTT DoCoMo, 3GPP TSG RAN WG 1 Ad Hoc on LTE, Sophia Antipolis, France, Jun. 20-21, 2005; pp. 1-14.
"Requirements for Evolved UTRA (E-UTRA) and Evolved UTRAN (E-UTRAN) (Release 7);" 3rd Generation Partnership Project; Technical Specification Group Radio Access Network; 3GPP TR 25.913 v.7.0.0, Jun. 2005; pp. 1-15.
European Search Report dated Jul. 4, 2013 from corresponding European Patent Application No. 06790556.1, 8 pages.
NTT Docomo, "Pilot Channel and Scrambling Code in Evolved UTRA Downlink", 3GPP Draft; R1-050589_Pilot Channel and Scrambling Code in Evolved UTRA Downlink, 3rd Generation Partnership Project (3GPP), Mobile Competence Centre; 650, Route des Lucioles, F-06921, Sophia-Antipolis Cedex, France, Jun. 16, 2005, 24 pages.
Nortel "Proposal for the Downlink Pilots for E-UTRA", 3GPP Draft; R1-050893, 3rd Generation Partnership Project (3GPP), Mobile Competence Centre; 650, Route des Lucioles; F-06921 Sophia Antipolis Cedex; France, Aug. 25, 2005, 30 pages.
Nortel, "Proposal for the Downlink Pilots fro E-UTRA", 3GPP Draft; R1-05I155, 3rd Generation Partnership Project (3GPP), Mobile Competence Centre; 650, Route des Lucioles; F-06921 Sophia Antipolis Cedex; France, Oct. 4, 2005, 34 pages.
Office Action for European Patent Application No. 06721726.5, dated Sep. 14, 2016, pp. 1-4.

METHODS AND SYSTEMS FOR ORTHOGONAL FREQUENCY DIVISION MULTIPLEXING (OFDM) MULTIPLE ZONE PARTITIONING

PRIORITY CLAIM

This application is a continuation of U.S. patent application Ser. No. 15/143,712, filed May 2, 2016, which is a continuation of U.S. patent application Ser. No. 14/458,131, filed on Aug. 12, 2014 (issued as U.S. Pat. No. 9,331,880 on May 3, 2016), which is a continuation of U.S. patent application Ser. No. 13/944,010, filed on Jul. 17, 2013 (issued as U.S. Pat. No. 8,811,544 on Aug. 19, 2014), which is a continuation of U.S. patent application Ser. No. 13/292,643, filed on Nov. 9, 2011 (issued as U.S. Pat. No. 8,542,771 on Sep. 24, 2013), which is a continuation of U.S. patent application Ser. No. 12/064,563, filed on Feb. 22, 2008 (issued as U.S. Pat. No. 8,073,063 on Dec. 6, 2011), which is a National Stage of and claims the benefit of priority from PCT/CA2006/001383, filed on Aug. 23, 2006, which claims the benefit of priority from U.S. Provisional Patent Application No. 60/710,527, filed on Aug. 23, 2005; the disclosures of each of which are fully incorporated herein by reference in their respective entireties.

BACKGROUND

Field of the Application

The invention relates to the field of wireless communications. More specifically, the invention relates to OFDM air interfaces.

Background of the Disclosure

Orthogonal frequency division multiplexing (OFDM) is a form of multiplexing that distributes data over a number of carriers that have a very precise spacing in the frequency domain. The precise spacing and partially overlapping spectra of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

In an OFDM system, a pilot channel is usually used to obtain transmission channel information to enable coherent detection. One type of pilot channel is a common pilot channel that is used by all transmitters and receivers in a telecommunication cell. Another type of pilot channel is a dedicated pilot channel that is used by transmitters and can only be detected by receivers to which the pilot channel is directed. These two types of pilot channels are currently applied in different systems.

SUMMARY

According to a first broad aspect of the invention, there is provided a method for inserting data and pilot symbols into Orthogonal Frequency Division Multiplexing (OFDM) frames for transmission on N transmitting antennas where N≥1, the OFDM frames having a time domain and a frequency domain, each OFDM frame comprising a plurality of OFDM symbols, the method comprising: partitioning N OFDM frames to be simultaneously transmitted on N antennas into at least two sets of corresponding blocks, each set of corresponding blocks consisting of one block for each of the N OFDM frames, all the blocks in a given set of corresponding blocks having a common size and location; for each antenna; allocating at least one set of corresponding blocks for transmission of common pilot symbols and allocating at least one set of corresponding blocks for transmission of pilot symbols dedicated to at least one receiver; in each block of each set of corresponding blocks allocated for transmission of common pilot symbols, inserting a two dimensional array of data and common pilot symbols in time-frequency; in each block of each set of corresponding blocks allocated for transmission of pilot symbols dedicated to at least one receiver, inserting a two dimensional array of data and pilot symbols dedicated to the at least one receiver in time-frequency.

In some embodiments the method further comprises performing pre-processing of pilot symbols dedicated to the at least one receiver to encode the pilot symbols for detection by only the at least one receiver.

In some embodiments partitioning N OFDM frames to be simultaneously transmitted on N antennas into at least two sets of corresponding blocks is based on time division multiplexing (TDM).

In some embodiments partitioning N OFDM frames to be simultaneously transmitted on N antennas into at least two sets of corresponding blocks is based on frequency division multiplexing (FDM).

In some embodiments partitioning N OFDM frames to be simultaneously transmitted on N antennas into at least two sets of corresponding blocks is based on combined TDM/FDM.

In some embodiments the method further comprises inserting control information in a control channel formed in at least one OFDM symbol duration in each set of corresponding blocks.

In some embodiments the control information in each set of blocks comprises one of a group consisting of: a set of blocks for transmission of common pilot symbols; a set of blocks for transmission of dedicated pilot symbols; and a set of blocks for transmission of both common pilot symbols and dedicated pilot symbols.

In some embodiments in each block of each set of corresponding blocks allocated for transmission of common pilot symbols, inserting a two dimensional array of data and common pilot symbols in time-frequency comprises inserting a common pilot symbol and nulls corresponding to locations of common pilot symbols of each other block of the set of corresponding blocks.

In some embodiments in each block of each set of corresponding blocks allocated for transmission of common pilot symbols, inserting a two dimensional array of data and common pilot symbols in time-frequency comprises inserting at least one common pilot symbol and nulls in one or both of: a control channel portion and a data symbol portion of each block.

In some embodiments in each block of each set of corresponding blocks allocated for transmission of dedicated pilot symbols, inserting a two dimensional array of data and common pilot symbols in time-frequency comprises inserting a dedicated pilot symbol and inserting nulls in locations in time-frequency corresponding to locations of dedicated pilot symbols of each other block of the set of corresponding blocks.

In some embodiments in each block of each set of corresponding blocks allocated for transmission of dedicated pilot symbols, inserting a two dimensional array of data and dedicated pilot symbols in time-frequency comprises inserting at least one dedicated pilot symbol and nulls in one or both of: a control channel portion and a data symbol portion of each block.

In some embodiments in each block of a respective OFDM symbol allocated for transmission of common pilot symbols, inserting a two dimensional array of data and common pilot symbols in time-frequency comprises inserting collectively at least one common pilot symbol and nulls in locations in time-frequency corresponding to locations of common pilot symbols of each other block of the set of corresponding blocks with a common pattern; and in each block of a respective OFDM symbol allocated for transmission of dedicated pilot symbols, inserting a two dimensional array of data and dedicated pilot symbols in time-frequency comprises inserting collectively at least one dedicated pilot symbol and nulls in locations in time-frequency corresponding to locations of dedicated pilot symbols of each other block of the set of corresponding blocks with a common pattern.

In some embodiments the common pattern for the at least one common pilot symbol and nulls is the same common pattern for the at least one dedicated pilot symbol and nulls.

In some embodiments the same common pattern is a diagonal shaped lattice.

In some embodiments the common pattern for the at least one common pilot symbol and nulls is a different common pattern than for the at least one dedicated pilot symbol and nulls.

In some embodiments inserting a two dimensional array of data and common pilot symbols in time-frequency comprises inserting data and common pilot symbols encoded for transmission using an open loop orthogonal frequency division multiplexing (OFDM) MIMO (multiple input multiple output) format.

In some embodiments inserting a two dimensional array of data and pilot symbols dedicated to the at least one receiver in time-frequency comprises inserting data and dedicated pilot symbols encoded for transmission using a closed loop OFDM MIMO beam forming format.

In some embodiments the method further comprises: setting a transmission power for transmitting data symbols and common pilot symbols in sets of corresponding blocks allocated for transmission of common pilot symbols; setting a transmission power for transmitting data symbols and dedicated pilot symbols in sets of corresponding blocks allocated for transmission of dedicated pilot symbols.

In some embodiments the transmission power for transmitting data symbols and common pilot symbols is different than transmission power for transmitting data symbols and dedicated pilot symbols.

In some embodiments the transmission power used for transmitting data symbols and dedicated pilot symbols is dynamically configurable.

In some embodiments the method further comprises inserting common pilot symbols in the at least one set of corresponding blocks for transmission of dedicated pilot symbols.

In some embodiments the method further comprises: for at least one antenna, in at least one block of a set of corresponding blocks allocated for transmission of dedicated pilot symbols, inserting a larger number of dedicated pilot symbols than are inserted in other blocks of the set of corresponding blocks of other antennas.

In some embodiments each block in each set of corresponding blocks comprises an odd number of OFDM symbols.

In some embodiments the common size of all blocks in each set of corresponding blocks is dynamically configurable.

According to a second aspect of the invention, there is provided an OFDM transmitter comprising: N transmitting antennas where N≥1, for transmitting OFDM frames having a time domain and a frequency domain, each OFDM frame comprising a plurality of OFDM symbols; space-time coding (STC) logic adapted to: partition N OFDM frames to be simultaneously transmitted on the N transmitting antennas into at least two sets of corresponding blocks, each set of corresponding blocks consisting of one block for each of the N OFDM frames, all the blocks in a given set of corresponding blocks having a common size and location; and for each of the N transmitting antennas the space-time coding (STC) logic adapted to: allocate at least one set of corresponding blocks for transmission of common pilot symbols and allocate at least one set of corresponding blocks for transmission of pilot symbols dedicated to at least one receiver; insert a two dimensional array of data and common pilot symbols in time-frequency in each block of each set of corresponding blocks for transmission of common pilot symbols; insert a two dimensional array of data and pilot symbols dedicated to the at least one receiver in time-frequency in each block of each set of corresponding blocks for transmission of pilot symbols dedicated to at least one receiver.

In some embodiments the OFDM transmitter is adapted to transmit one pilot per antenna arranged in a two by two time-frequency block for a four antenna structure.

The broad aspects described above it is stated that the number of transmitting antennas is equal to N where, N≥1. In some embodiments of the invention N=2. In some embodiments of the invention N=4.

Other aspects and features of the present invention will become apparent to those ordinarily skilled in the art upon review of the following description of specific embodiments of the invention in conjunction with the accompanying figures. TBD

BRIEF DESCRIPTION OF THE DRAWINGS

Embodiments of the invention will now be described with reference to the attached drawings in which.

DETAILED DESCRIPTION

Figure 1A:
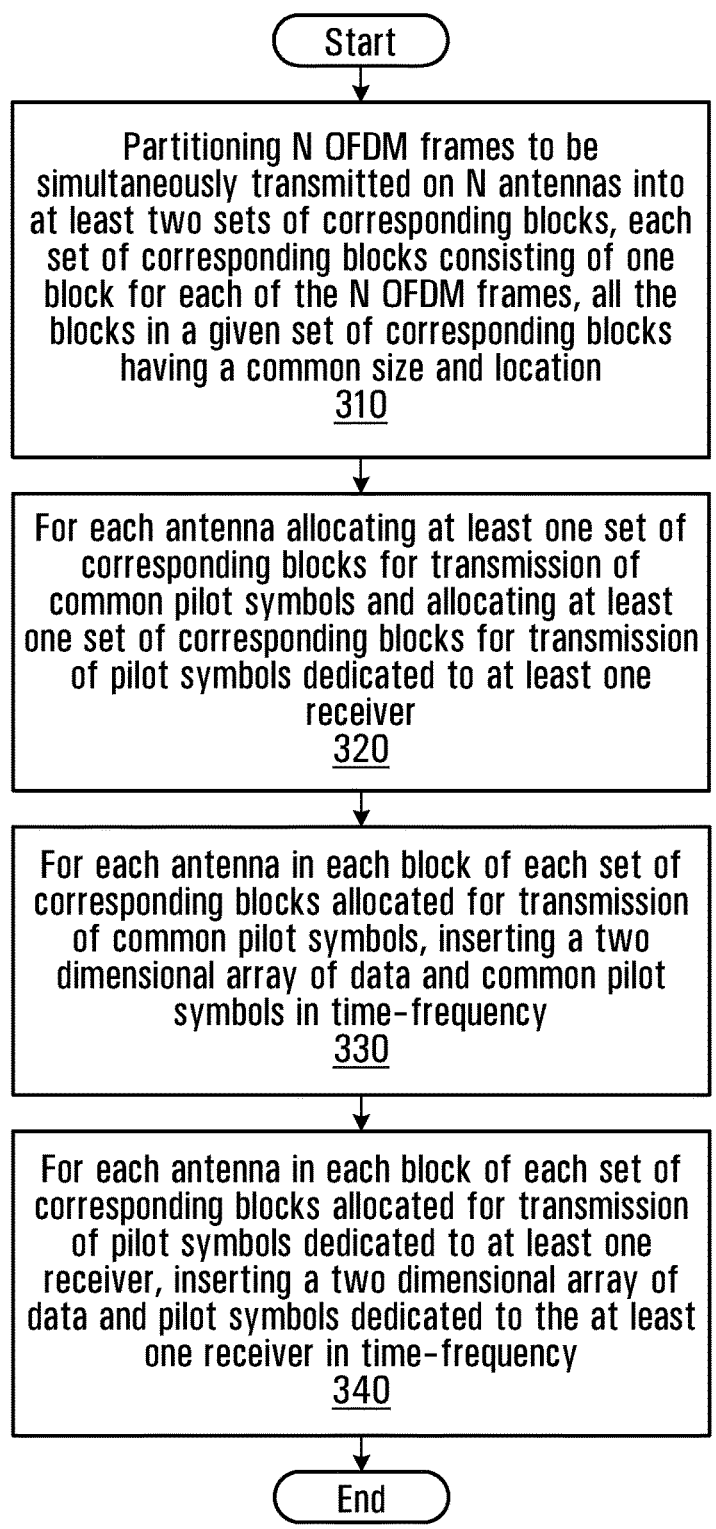
FIG. 1A is a flowchart of a method by which data symbols and pilot symbols are inserted into an OFDM frame according to an embodiment of the invention.

According to an aspect of the invention, there is provided a method for inserting data and pilot information into Orthogonal Frequency Division Multiplexing (OFDM) frames, each frame having a time domain and a frequency domain and including at least one OFDM symbol. With reference to FIG. 1A, the method will be discussed in further detail. FIG. 1A illustrates a flow chart for performing the method.

In some embodiments the method is used for creating time-frequency patterns for transmitting from a base station on one or more transmitting antennas to one or more receivers, which may have one or more antenna. An example of a receiver is a mobile station (MS). In some embodiments a mobile station is a wireless device such as a cellular telephone, computer with a wireless modem, or personal digital assistant (PDA). In some implementations the receiver has a fixed location. In other implementations the receiver is nomadic or mobile.

A first step 310 involves partitioning N OFDM frames to be simultaneously transmitted on N antennas into at least two sets of corresponding blocks, each set of corresponding blocks consisting of one block for each of the N OFDM frames, all the blocks in a given set of corresponding blocks having a common size and location. A second step 320 involves for each antenna allocating at least one set of corresponding blocks for transmission of common pilot symbols and allocating at least one set of corresponding blocks for transmission of pilot symbols dedicated to at least one receiver. A third step 330 involves, for each antenna in each block of each set of corresponding blocks allocated for transmission of common pilot symbols, inserting a two dimensional array of data and common pilot symbols in time-frequency. A fourth step 340 involves, for each antenna in each block of each set of corresponding blocks allocated for transmission of pilot symbols dedicated to at least one receiver, inserting a two dimensional array of data and pilot symbols dedicated to the at least one receiver in time-frequency.

Generally, within the description each set of corresponding blocks is referred to as a zone. Therefore, a first set of corresponding blocks allocated for transmission of common pilot symbols may be referred to as a common pilot symbol zone and a second set of corresponding blocks allocated for transmission of dedicated pilot symbols may be referred to as a dedicated pilot symbol zone. In an event an OFDM frame includes multiple occurrences of the first and/or second set of corresponding blocks, the multiple occurrences are collectively referred to as being a common pilot symbol zone or dedicated pilot symbol zone, respectively.

A common pilot symbol is a pilot symbol that has been encoded by the transmitter in such a manner that any receiver receiving the pilot symbols is capable of determining that the received symbol at a particular location in time-frequency is a pilot symbol and can use the pilot symbol accordingly.

A dedicated pilot symbol is a pilot symbol that has undergone pre-processing and has been encoded by the transmitter in such a manner that only a particular receiver or receivers that are aware of the particular pre-processing used to encode the pilot symbol is/are capable of determining that the symbol at a particular location in time-frequency is a pilot symbol and can use the pilot symbol accordingly.

In some embodiments common pilot symbols may be included in the blocks that have predominantly dedicated pilot symbols to allow receivers not capable of detecting the dedicated pilot symbol an opportunity to determine channel quality measurements in those blocks.

Figure 1B:
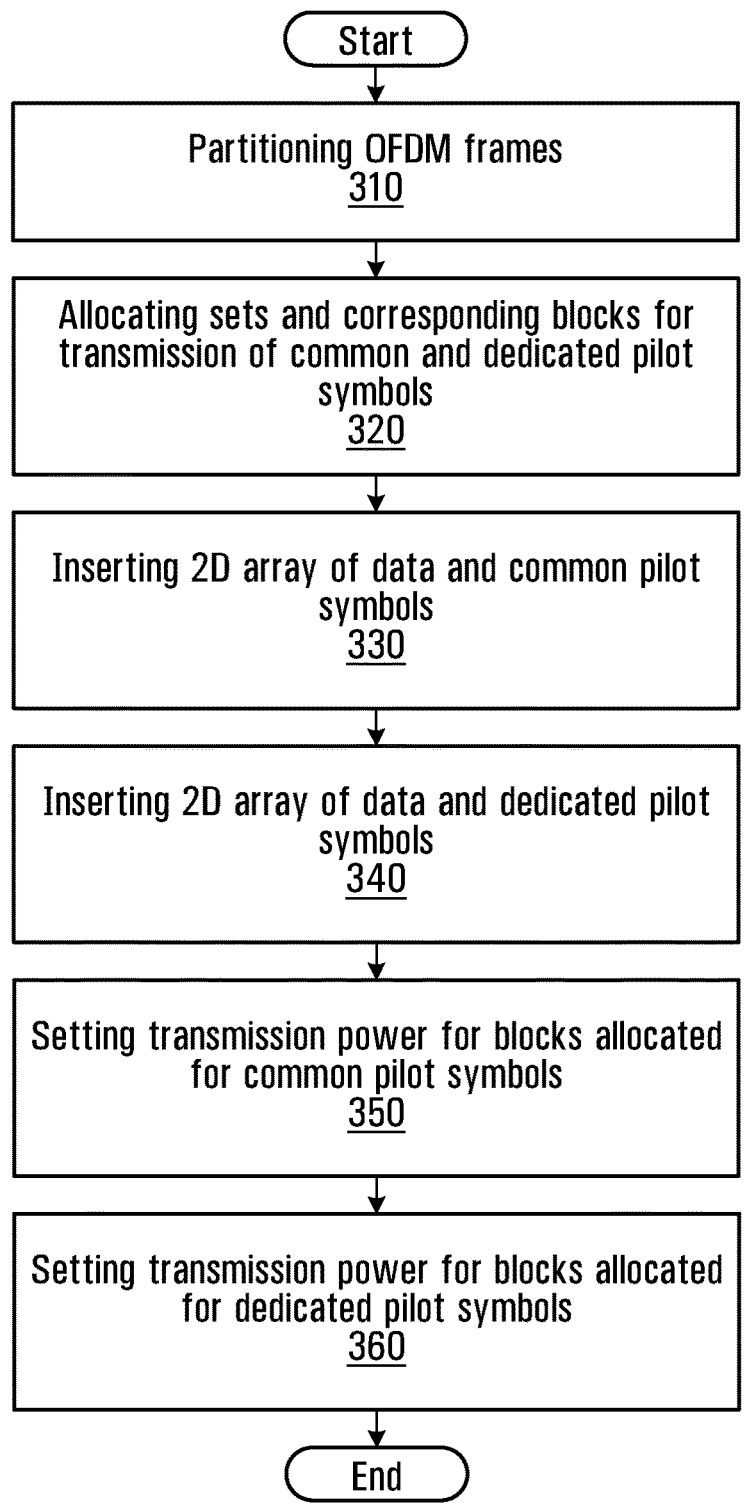
FIG. 1B is a flowchart of a method by which data symbols and pilot symbols are inserted into an OFDM frame according to another embodiment of the invention.

FIG. 1B shows a flow chart for a method according to another embodiment of inserting data and pilot information into Orthogonal Frequency Division Multiplexing (OFDM) frames in which steps 310, 320, 330 and 340 are the same as in FIG. 1A. An additional step in the method is step 350, which involves setting the transmission power for blocks allocated for common pilot symbols. Step 360, involves setting the transmission power for blocks allocated for dedicated pilot symbols. In some embodiments the transmission power for the blocks allocated for common pilot symbols is the same for blocks allocated for dedicated pilot symbols. In some embodiments the transmission power for the blocks allocated for common pilot symbols is different than for blocks allocated for dedicated pilot symbols. In some embodiments, the transmission power is set the same for both data symbols and pilots symbols in the blocks allocated for common pilot symbols. In some embodiments, the transmission power is set the same for both data symbols and pilots symbols in the blocks allocated for dedicated pilot symbols. In some embodiments the transmission power is set differently for data symbols than for pilots symbols in the blocks allocated for common pilot symbols. In some embodiments the transmission power is set differently for data symbols than for pilots symbols in the blocks allocated for common pilot symbols.

In some embodiments a power control ratio between data symbols and pilot symbols is maintained to ensure consistent channel estimates for all receivers. The use of zones allocated for transmission of common pilot symbols and zones allocated for transmission of dedicated pilot symbols allows for varying transmission power to different receivers, while maintaining the power control ratio for a given receiver. For zones using common pilot symbols, the data symbols for different respective receivers and the common pilot symbols used for all receivers maintain a consistent power control ratio by maintaining a constant transmission power because the common pilot symbols are all transmitted with a constant proportional power level to that of the data symbols for the respective receivers. For zones using dedicated pilot symbols, the data symbol transmit power for different respective receivers can be increased or decreased as well as the dedicated pilot symbols associated with those different respective receivers and therefore each respective receiver maintains a consistent power control ratio. In some embodiments, receivers that require a larger transmission power for both data and pilots, for example receivers that are geographically located at the edge of a communication cell, are attended to by using a different transmission zone than receivers in closer proximity to the transmitter. In some embodiments the zones allocated for transmission of dedicated pilot symbols have a different transmission power for data symbols and pilot symbols than a transmission power used for data symbols and pilot symbols transmitted in zones allocated for transmission of common pilot symbols.

In some embodiments the data symbol and the pilot symbol transmission powers respectively, can be increased in the dedicated pilot symbol zone such that the power control ratio is maintained. Only receivers that are aware of the pre-processing used to encode the dedicated pilots are capable of using the dedicated pilots for channel estimation because those receivers are aware of the pre-processing used to encode the dedicated pilots.

In some embodiments a zone allocated for transmission of common pilot symbols is used to transmit to receivers within range of the transmitter that maintain an acceptable quality of received transmission. All receivers are capable of using the common pilots for channel estimation because the pre-processing used to encode the common pilots is known to all receivers.

In some embodiments an additional number of dedicated pilots may be inserted in the zone allocated for transmission of dedicated pilot symbols for one or more antennas. For example, this may be performed at step 340 of FIG. 1A or FIG. 1B. An additional number of dedicated pilots may be advantageous in the above-described example in which the receiver is at the edge of a communication cell and extra pilots would enable a better estimate of the channel between transmitter and receiver.

In some embodiments, in zones allocated for transmission of common pilot symbols having a known location sequence, in select zones an additional number of pilot sub-carriers are inserted between two known location common pilot symbols to increase the density of the pilots to enable a better estimate of the channel between transmitter and receiver.

In some embodiments, a pattern used in zones allocated for common pilot symbols is a same pattern used in zones allocated for dedicated pilot symbol.

Various examples of OFDM frames having particular time-frequency patterns with zone partitioning formed using the method described above will be described in detail below with regard to FIGS. 2 to 7.

Figure 2:
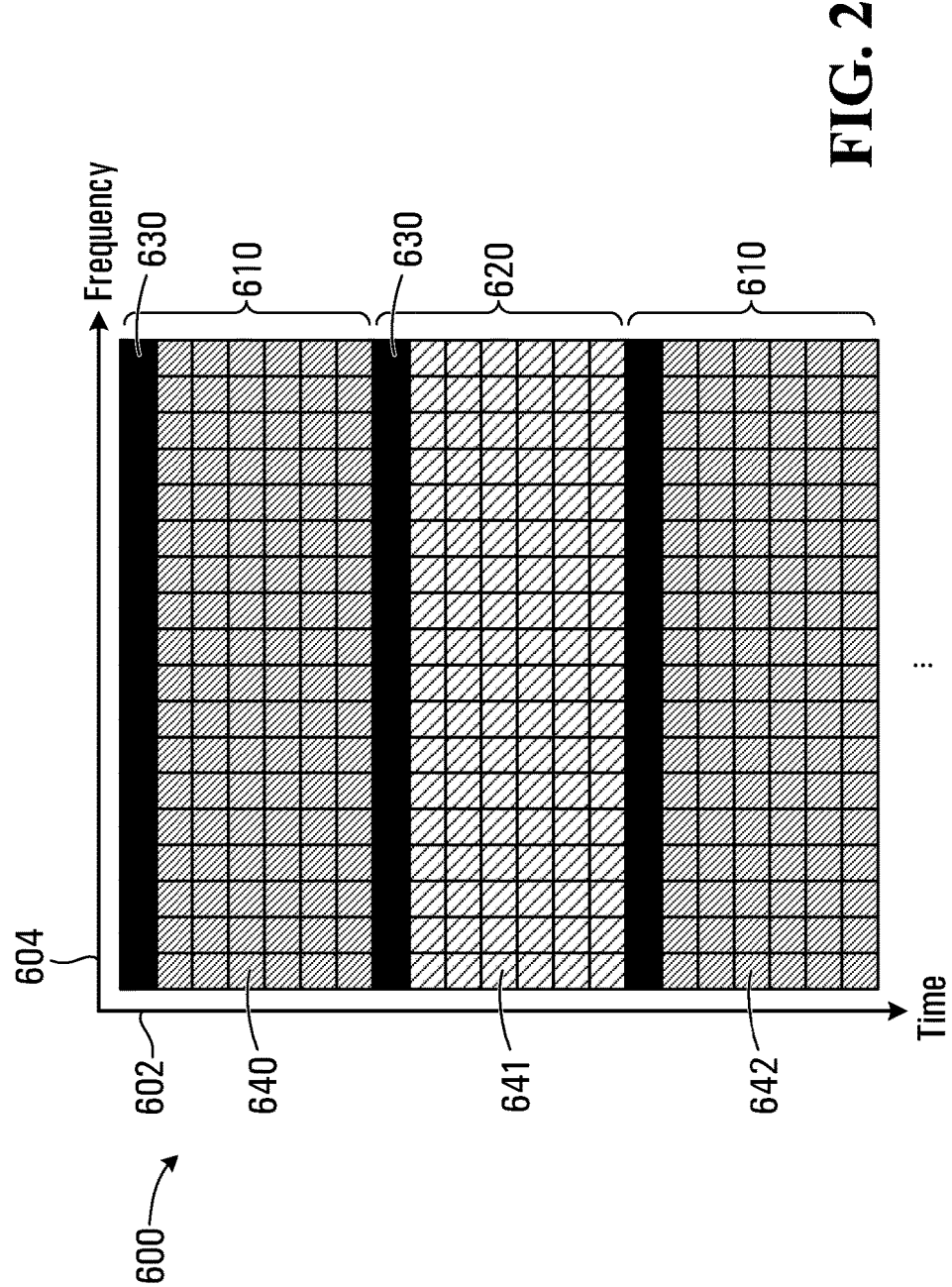
FIG. 2 is a schematic diagram of a time division multiplexing (TDM) Based Zone Partition arrangement for a common pilot zone and a dedicated pilot zone according to an embodiment of the invention.

FIG. 2 shows an example time division multiplexing (TDM) Based Zone Partition pattern 600 employed for transmitting data and pilot symbols. The TDM Based Zone Partition pattern 600 is shown having a two dimensional appearance in which the horizontal direction 604 is frequency and the vertical direction 602 is time. In the frequency direction, each discrete vertical column represents a single sub-carrier. Each discrete horizontal row represents an OFDM symbol.

In the example of FIG. 2, each OFDM symbol is shown to utilize the entire allocated frequency spectrum. The allocated frequency spectrum is formed from multiple adjacent sub-carriers.

FIG. 2 illustrates an embodiment in which an OFDM frame is the entire TDM Based Zone Partition pattern 600. The OFDM frame is partitioned into three blocks 640,641, 642. The three blocks are allocated to a zone for transmission of data and common pilot symbols and a zone for transmission of data and pilot symbols dedicated to at least one receiver, or dedicated pilots. In the illustrated example blocks 640,642 constitute a first zone 610 for transmission of common pilot symbols and blocks 641 constitutes a second zone 620 for transmission of dedicated pilot symbols. An OFDM transmission frame includes at least one of each type of zone.

In some embodiments, multiple antennas each transmit a respective corresponding OFDM frame, in which each corresponding OFDM frame is partitioned into a corresponding number of blocks. Each set of corresponding blocks consists of one block for each of the corresponding OFDM frames. All of the blocks in a given set of corresponding blocks have a common size and location in the corresponding OFDM frames. The sets of blocks are either designated as a first zone or a second zone. In some embodiments the first zone is for transmission of data and common pilot symbols. In some embodiments the second zone is for transmission of data and dedicated pilot symbols.

In some embodiments partitioning of the OFDM frame is based on dividing the frame into multiple blocks and assigning each block to either a first or second zone. In some embodiments these block may be aligned with transmission time intervals (TTI). For example, in FIG. 2 the blocks 640, 641, 642 are consistent with a TTI definition in which each block includes a single TTI having seven OFDM symbols. In some embodiments the multiple TTIs each have an equal duration. For example, a frame having a duration equal to 10 ms may include five TTIs, which are each 2 ms in duration. More generally, the number of TTIs in a frame is implementation specific. In some embodiments the number of TTIs in the frame and their respective durations are dynamically configurable. Once the number and duration of TTIs is set in the frame the respective durations of the TTIs remain the same until they are reconfigured.

The number of TTI in either type of zone is one or more. Furthermore, the number of TTI in different types of zones may or may not be equal.

The TTI in the TDM Based Zone Partition pattern 600 are formed from seven OFDM symbols each. In some embodiments, the TTI in either type of zone comprise an odd number of OFDM symbols per TTI in accordance with 3GPP TR 25.814 v0.1.1 (June 2005). More generally, the number of OFDM symbols per TTI is implementation specific and may be more or less than the seven OFDM symbols shown in FIG. 2.

A first OFDM symbol in each TTI is illustrated to include control information in the form of a control channel 630 for each respective TTI. The control channel 630 may be used for transmitting control information from the transmitter to the receiver pertaining to controlling the link between the transmitter and receiver. For example, the control channel may include synchronization information or DL or UL MAP information. The remainder of the six OFDM symbols in each TTI include data and pilot symbols to be transmitted from the transmitter to the receiver. While only three control channels are shown in FIG. 2 it is to be understood that the number of control channels may be dependent upon the size of the TTI and the number of TTI in a frame.

In some embodiments pilot symbols, common or dedicated, are transmitted in only the OFDM symbol containing control channel information for each zone. In some embodiments pilot symbols, common or dedicated, are transmitted in only portions of the zone containing transmission data symbols. In some embodiments pilot symbols, common or dedicated are transmitted in both a control channel portion and the portions of the zone containing data symbols.

It is to be understood that the position of the control channel is implementation specific and is not limited to a first OFDM symbol location of each TTI as shown in FIG. 2. In some embodiments, the control channel is located at the same location in the TTI for each TTI in the TDM Based Zone Partition pattern. In some embodiments, the control channel is located in a different location in the TTI for each different zone in the TDM Based Zone Partition pattern. In some embodiments, in a same zone the control channel is located at a different position in one or more TTI of the same frame.

In OFDM transmission, MIMO (multiple input multiple output) transmission involves a one or more transmitters each having multiple antennas communicating with one or more receivers each having multiple antennas. Each transmitting antenna/receiving antenna path occurs over a channel having a particular channel characteristic. In some embodiments, OFDM MIMO transmission is implemented as an open loop type of transmission in which channel characteristics between a given transmitting and receiving antenna are unknown at the time of transmission. When channel characteristics are known for a channel between a given transmitting and receiving antenna, these known channel characteristics can be used to optimize the transmission from transmitter to receiver. One manner to optimize the transmission is to pre-process the signal to be transmitted in a manner that helps to compensate for the known channel characteristics. In some embodiments, this includes providing different weights to data and pilot symbols in different transmitting antennas known as beam forming. When channel characteristics are known and used for compensation, this is generally referred to as a closed loop type of MIMO transmission.

In some embodiments a first zone, for example 610 in FIG. 2 is allocated for transmission of common pilot symbols is used for transmission of data and common pilot symbols using a first MIMO format, for example an open loop OFDM MIMO as described above. In some embodiments a second zone, for example 620 in FIG. 2 is allocated for transmission of dedicated pilot symbols is used for transmission of data and dedicated pilot symbols using a second MIMO format, for example OFDM beam forming. Beam forming in this context refers to pre-processing of an OFDM MIMO transmission in a closed loop manner as described for example, above. It is to be understood that open loop MIMO and closed loop MIMO beam forming are only two examples of MIMO transmission formats that can be used for transmitting common pilot symbols and dedicated pilot symbols, respectively and that these two transmission formats is not intended to limit the scope of the invention. Additional examples of types of MIMO formats include, but are not limited to: Blast, SM (spatial multiplexing) and STTD (space-time transmit diversity).

In some embodiments a MIMO format may be selected for the dedicated pilot symbol zone for implementing power control transmissions in which only one or more particular receivers are being communicated.

FIG. 2 shows blocks in each zone equal to one TTI having seven OFDM symbols, alternating one after another, however it is to be understood that the arrangement of the TTI in the different zones is implementation specific. In some implementations a first zone, including several TTI allocated for transmission of common pilot symbols, each TTI having a same number of OFDM symbols, is transmitted before a second zone including several TTI allocated for transmission of dedicated pilot symbols is transmitted. In some embodiments the arrangement of zones with TTI having the same number of OFDM symbols is periodic in the frame. In some embodiments the arrangement of zones allocated for transmission of common or dedicated pilot symbols, respectively is not periodic, but is arranged based on a desired usage of common or dedicated pilot symbols by the transmitter. In some embodiments adjacent zones have a different number of TTI and maintain a repeating pattern of alternating types of zones even though a ratio of transmission of TTI in a zone allocated for transmission of common pilot symbols to TTI in a zone allocated for transmission of dedicated pilot symbols is greater than or lesser than if the zones were the same size.

In some embodiments, data being transmitted from a transmitter is encoded using pre-processing techniques that increase a Channel Quality Indicator (CQI) value to optimize transmission energy for a particular receiver. In some embodiments the particular receiver or receivers are provided with a knowledge of the pre-processing technique used to encode the dedicated pilot symbols prior to the pilot symbols being transmitted. This can be performed in a similar manner to how the receiver is notified of the pre-processing technique used for encoding data that is specific to a receiver so that other receivers cannot decode data directed to that receiver.

An example of a pre-processing technique used to encode data in a dedicated pilot zone is generating a pre-processing matrix defining the transmission characteristics for transmission to a particular receiver or receivers. For example, in beam forming, pre-processing may involve elements in the pre-processing matrix being weighted to compensate for known channel conditions. The pre-processing matrix is applied to the data by the transmitter following which the pre-processed data is transmitted to one or more receivers. In some embodiments dedicated pilot symbols are encoded in a similar manner to the data in the dedicated pilot symbol zone.

In some embodiments, when the transmitter is responsible for determining the pre-processing matrix used to encode the data in the dedicated pilot symbol zone, the transmitter sends information defining the type of pre-processing to the receiver on a signaling channel so that the receiver will be able to detect the pre-processed data. A signaling channel may be included in control channel information on the control channel. In some embodiments, the receiver can decode the pre-processed data based on received dedicated pilot symbols that have been encoded in a similar fashion to the data.

In some embodiments, when the receiver is responsible for the determining the pre-processing matrix used to encode the dedicated pilot information the receiver sends this information to the transmitter so that the transmitter can encode the dedicated pilot symbols in the manner desired by the receiver.

Figure 3:
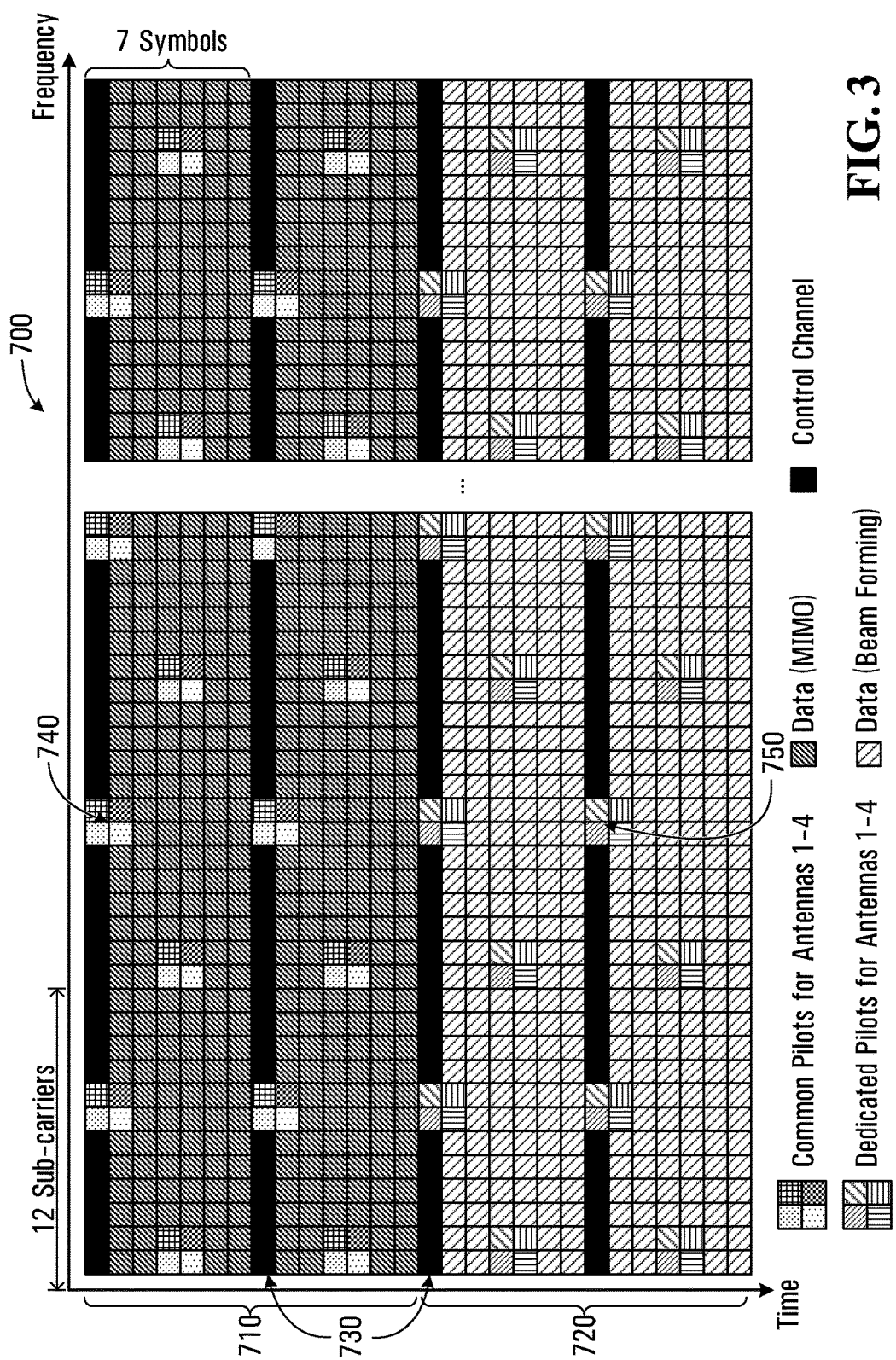
FIG. 3 is a schematic diagram of a TDM Based Zone Partition arrangement for transmission according to an embodiment of the invention for a MIMO zone and a beam forming zone.

FIG. 3 shows an example TDM Based Zone Partition pattern 700 employed for transmitting data and pilots in a transmitter with four antennas. The TDM Based Zone Partition pattern 700 is shown having a two dimensional appearance in which the horizontal direction is frequency and the vertical direction is time. Each vertical column represents a single sub-carrier. Each horizontal row represents an OFDM symbol.

The example TDM Based Zone Partition pattern 700 shows the combined data and pilot pattern for all four antennas. The pattern transmitted by a given antenna includes the data in locations common to all the antennas and pilot symbols for transmission only by the given antenna. A grouping of pilot symbols shown in FIG. 3 would, for example be represented in a given antenna pattern by the pilot symbol for the given antenna and null symbol locations for each other antenna. The data and pilots in each zone may be intended for one or more receivers that are currently within the cell of the transmitter.

FIG. 3 illustrates an embodiment of the invention in which a first zone 710 allocated for transmission of common pilot symbols is shown to be for OFDM MIMO transmission and a second zone 720 allocated for transmission of dedicated pilot symbols is shown to be for OFDM beam forming transmission.

While the second zone with dedicated pilots in the illustrated example is described to be for OFDM beam forming transmission, this is not meant to limit the scope of the invention to only this type of transmission.

Individual zones in the TDM Based Zone Partition pattern 700 are formed from one or more TTI having seven OFDM symbols each. In some embodiments, the first zone 710 and the second zone 720 have TTI with an odd number of OFDM symbols in accordance with 3GPP TR 25.814 v0.1.1 (June 2005). More generally, the number of OFDM symbols per TTI is implementation specific and may be more or less than the seven OFDM symbols that are shown in the respective TTI of FIG. 3. Also, the number of TTI per zone is implementation specific.

A first OFDM symbol in each respective TTI is a control channel 730 for that TTI. It is to be understood that the position of the control channel is implementation specific and is not limited to a first OFDM symbol location of each TTI as shown in FIG. 3. In some embodiments, the control channel is located at the same location of the TTI for each zone in the TDM Based Zone Partition pattern. In some embodiments, the control channel is located in a different location of a TTI for different zones in the TDM Based Zone Partition pattern. In some embodiments, in a same zone the control channel is located at a different position in one or more TTI of the same frame. While only four control channels are shown in FIG. 3 it is to be understood that in some embodiments the number of control channels is dependent upon the size of TTI and/or the number of TTI in a frame.

The example of FIG. 3 illustrates pilot symbols that are allocated to both an OFDM symbol including the control channel 730 and the portions of the TTI containing data symbols in each respective TTI. In some embodiments pilot information is transmitted in only the OFDM symbol including the control channel 730 for each respective TTI. In some embodiments pilot information is transmitted in only the portions of the TTI containing data symbols. In some embodiments pilot information is transmitted in both the OFDM symbol including the control channel and the portions of the TTI containing data symbols.

The TDM Based Zone Partition pattern 700 includes groupings of four pilot symbols 740,750, one symbol for each antenna. For the first zone 710, the OFDM MIMO zone, the pilot symbols are common pilot symbols 740 so that any receiver can receive and detect the pilot symbols in this zone. For the second zone 720, the OFDM Beam forming zone, the pilot symbols are dedicated pilot symbols 750 so that only receivers aware of the pre-processing technique used on the pilots utilize the dedicated pilot symbols in this zone.

In FIG. 3, in the time direction there are two consecutive seven OFDM symbol MIMO TTI, each TTI consisting of a number of MIMO transmission blocks (for example, 12 sub-carriers by 7 OFDM symbols), followed by two consecutive beam forming transmission TTI. The pattern is also repeated in the frequency direction with a twelve subcarrier period. More generally, an arrangement in the time direction for a first zone and a second zone is implementation specific and may include any number of TTI allocated for transmission of common pilot symbols followed by any number of TTI allocated for transmission of dedicated pilot symbols. In some embodiments this pattern repeats multiple times for a frame. In some embodiments an alternating pattern of zones have a different number of TTI adjacent to one another for each respective occurrence of each type of zone. Similarly, in the frequency direction, the period of the pattern is implementation specific and may include a period having any number of TTI.

For each seven OFDM symbol by twelve subcarrier transmission block, either MIMO zone or beam forming zone, FIG. 3 shows two groupings of pilot symbols 740,750. The groupings of pilot symbols, both common and dedicated are shown to be a two subcarrier by two symbol duration (or two by two time-frequency) grouping. It is to be understood by those skilled in the art that other patterns for the grouping of pilot symbols may be used. For example, other patterns may include a single subcarrier by four symbol duration grouping or a four subcarrier by single symbol duration grouping. In some embodiments a grouping of pilot symbols is one in which only some of the pilot symbols are directly adjacent to one another. In some embodiments a grouping of pilot symbols is one in which none of the pilot symbols are directly adjacent to one another.

In FIG. 3 there are two groupings of pilot symbols per seven OFDM symbol by twelve subcarrier transmission block for both the common and dedicated pilot patterns in the first zone 710 and in the second zone 720, respectively. If is to be understood that the number of pilot symbol groupings is implementation specific and not to be limited by the example embodiment.

In the illustrated embodiment, in the first zone 710, the groupings of common pilot symbols 740 are inserted in a diamond lattice pattern over the two consecutive TTI in the time direction. Similarly, in the second zone 720, the groupings of dedicated pilot symbols 750 are inserted using the same diamond lattice pattern as the pilot groups in the first zone 710. In the illustrated example four of every seven OFDM symbols carry encoded pilot symbols, but it is to be understood that depending on how pilot symbols are inserted in the zones and/or frame that the ratio of OFDM symbols having pilot symbols to OFDM symbols not having pilot symbols may vary.

In some embodiments the diamond lattice pattern in which each grouping of encoded pilot symbols, either common or dedicated is inserted within the OFDM frame is a perfect diamond lattice pattern. To achieve this, a grouping of encoded pilot symbols is inserted at each of a first subset of frequencies. The frequencies within the first subset of frequencies are spaced equally apart by a pilot spacing. At some later time, a grouping of encoded pilot symbols is inserted at each of a second subset of frequencies. The frequencies within the second subset of frequencies are shifted from the frequencies within the first subset of frequencies by half of the pilot spacing within the frequency direction. Groupings of pilot symbols are inserted in the frame alternating between the first subset of frequencies and the second subset of frequencies.

A different pilot pattern can be used, as long as the same pilot pattern is used for each of the pilot symbols corresponding to a particular antenna of the grouping of pilot symbols, and as long as the pilot patterns for the encoded pilot symbols are offset from each other in the time direction of the OFDM frame. For example, a diagonal pattern may be used; the diamond shaped lattice being a special case of this.

More generally, any staggered pattern of pilot symbols can be used. In some embodiments the groupings of pilot symbols are close enough together to ensure that there is time coherence and/or frequency coherence. Time coherence occurs when pilot symbols in the time direction are close enough in proximity that channel characteristics are substantially the same at the two points in time within an acceptable tolerance. Frequency coherence occurs when pilot symbols in the frequency direction are close enough in proximity that channel characteristics are substantially the same at two sub-carriers within an acceptable tolerance.

In some embodiments the respective pilot patterns that are used in the zone containing common pilot symbols and the zone containing dedicated pilot symbols are different pilot patterns.

FIG. 3 is described as being for a transmitter with four antennas. It is to be understood that a four antenna transmitter is a particular example and not meant to limit the scope of the invention. The number of antennas in a transmitter is an implementation specific variable. In some embodiments of the invention the TDM based zone partition pattern concept can be applied to any number of antenna equal to or greater than one. In some embodiments the number of pilot symbols in a pilot symbol grouping in the TDM Based Zone Partition patterns is dependent on the number of antennas in the transmitter.

Figure 4:
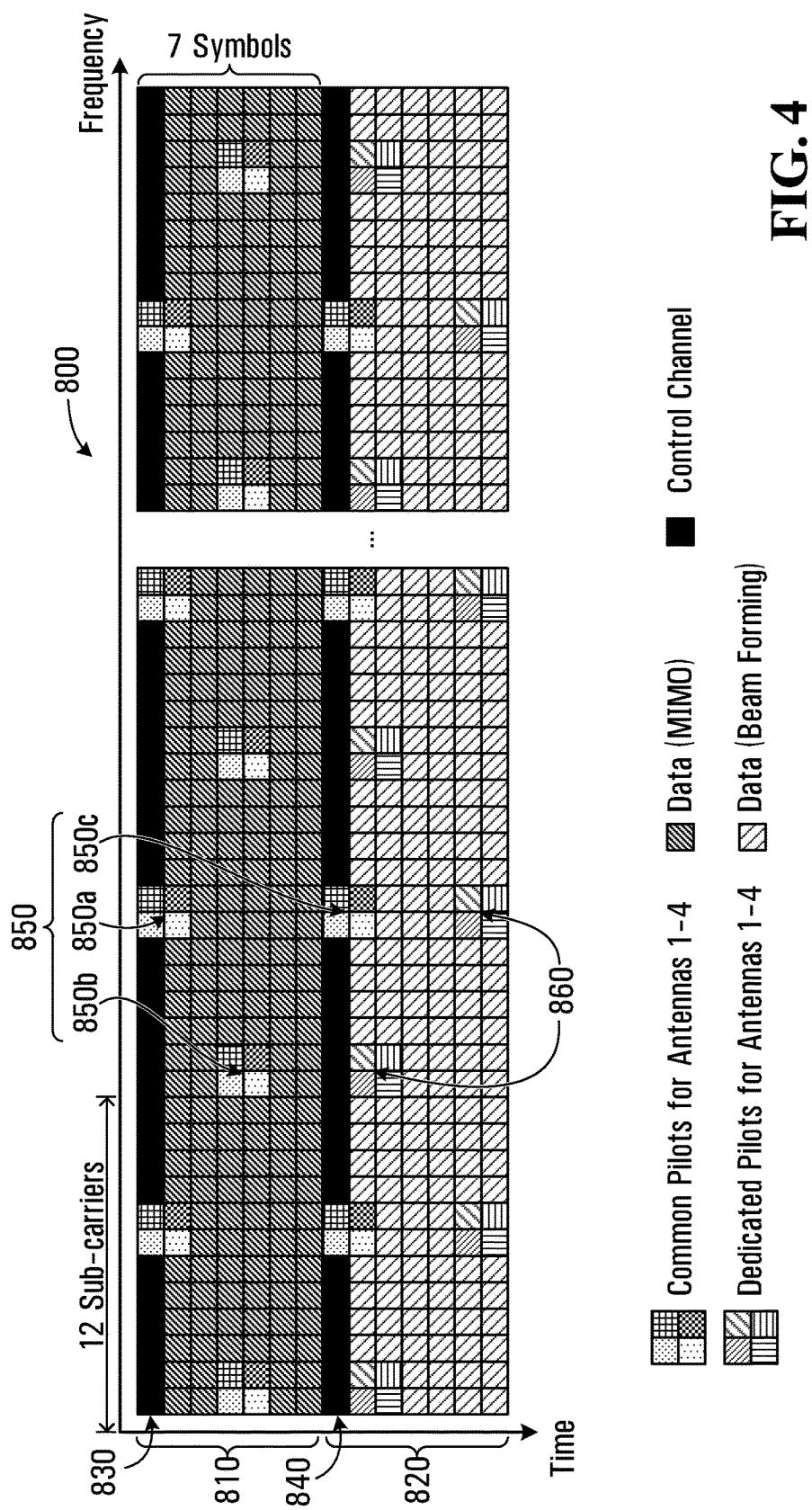
FIG. 4 is a further schematic diagram of a TDM Based Zone Partition arrangement for transmission according to an embodiment of the invention for a MIMO zone and a beam forming zone.

FIG. 4 shows another example TDM Based Zone Partition pattern 800 employed for transmitting data and pilots in a transmitter with four antennas. The TDM Based Zone Partition pattern 800 is shown having a two dimensional appearance in which the horizontal direction is frequency and the vertical direction is time. Each vertical column represents a single sub-carrier. Each horizontal row represents an OFDM symbol.

The example TDM Based Zone Partition pattern 800 shows the combined data and pilot pattern for all four antennas. The patterns for each respective antenna would represent the data and pilots symbols for transmission by each respective antenna only. A grouping of pilot symbols shown in FIG. 4 would, for example be represented in a given antenna pattern by the pilot symbol for the given antenna and null symbol locations for each other antenna. The data and pilots in each zone may be intended for one or more receivers that are currently within the cell of the transmitter.

FIG. 4 illustrates an embodiment in which a first zone 810 is shown to be for OFDM MIMO transmission and a second zone 820 is shown to be for OFDM beam forming transmission. The TTI utilized in the different zones of TDM Based Zone Partition pattern 800 are formed from seven OFDM symbols each. In some embodiments, the first zone and the second zone each have TTI with an odd number of OFDM symbols per TTI in accordance with 3GPP TR 25.814 v0.1.1 (June 2005). More generally, the number of OFDM symbols is implementation specific and may be more or less than the seven OFDM symbols shown in FIG. 4.

A first OFDM symbol in each respective TTI in the first zone 810 is a control channel 830 and a first OFDM symbol in each respective TTI in the second zone 820 is a control channel 840 for the second zone 820. While only two control channels are shown in FIG. 4 it is to be understood that in some embodiments the number of control channels is dependent upon the size of TTI and/or the number of TTI in a frame.

It is to be understood that the position of the control channel is implementation specific and is not limited to a first symbol location per TTI as shown in FIG. 4. In some embodiments, the control channel is located at the same location of the TTI for each zone in the TDM Based Zone Partition pattern. In some embodiments, the control channel is located in a different location of the TTI for each different zone in the TDM Based Zone Partition pattern. In some embodiments, in a same zone the control channel is located at a different position in different TTI of the same frame.

The example of FIG. 4 illustrates a grouping of common pilot symbols 850 that are allocated for the first zone 810, the MIMO zone, in the control channel 830 of the first zone and a data symbol portion of the first zone 810 (indicated at 850*a*), in the data symbol portion of the first zone 810 (indicated at 850*b*) and also in the control channel 840 and a data symbol portion of the second zone 820 (indicated at 850*c*). A grouping of dedicated pilot symbols 860 is allocated for the second zone 820, the beam forming zone and appears only in the data symbol portion of the second zone 820. Overlap of the common pilot symbols from the first zone 810 into the second zone 820 enables a diamond lattice pattern to occur in zone that is only a single TTI duration in the time direction. In the particular example of FIG. 4, the groupings of pilot symbols of the first zone 810 that overlap into the second zone 820 of the OFDM frame result in the fact that the second zone 820 does not have a complete diamond lattice pattern of pilot symbols in the single TTI. In some embodiments the transmissions in the second zone have only a small amount of channel variation over time. Channel estimates can be made for transmissions having only a small amount of channel variation over time by interpolating the groupings of pilot symbols in the second zone 820 with groupings of pilot symbols in non-adjacent second zone transmission blocks.

In some embodiments, all zones in a frame, whether they are one TTI in duration or more than one TTI in duration in the time direction, include a diamond lattice pattern that enables using adaptive 2D channel interpolation as described in assignee's co-pending PCT Patent Application No. PCT/CA2006/001380, filed on Aug. 22, 2006 which is hereby incorporated by reference in its entirety.

In FIG. 4, in the time direction there is one seven OFDM symbol MIMO transmission TTI followed by one seven OFDM symbol beam forming transmission TTI. The TTI contain multiple transmission blocks each having twelve sub-carriers so that a transmission block pattern is also repeated in the frequency direction with a twelve subcarrier period. More generally, an arrangement in the time direction for a zone allocated for transmission of common pilot symbols and a zone allocated for transmission of dedicated pilot symbols is implementation specific and may include any number of TTI in a repeating pattern of a zone allocated for transmission of common pilot symbols followed by any number TTI of a zone allocated for transmission of dedicated pilot symbols. In some embodiments this pattern may repeat multiple times for a frame. In some embodiments, in the time direction an alternating pattern of different types of zone have a different number of the same TTI adjacent to one another for each respective occurrence of the types of zones. Similarly, in the frequency direction the period of the pattern is implementation specific and may include a period having any number of TTI.

For each seven OFDM symbol by twelve subcarrier transmission block, either MIMO zone or beam forming zone, FIG. 4 shows two groupings of pilot symbols 850,860. The groupings of pilot symbols 850,860, both common and dedicated are shown to be a two subcarrier by two symbol duration grouping. It is to be understood by those skilled in the art that other patterns for the grouping of pilot symbols may be used. For example, other patterns may include a single subcarrier by four symbol duration grouping or a four subcarrier by single symbol duration grouping. In some embodiments a grouping of pilot symbols is one in which only some of the pilot symbols are directly adjacent to one another. In some embodiments a grouping of pilot symbols is one in which none of the pilot symbols are directly adjacent to one another, but are close enough together to ensure that there is time coherence and/or frequency coherence.

In some embodiments when the control channel is located in a different position than the first OFDM symbol per TTI as shown in FIG. 4, the grouping of pilot symbols that is shown overlapping into both the control channel and data symbol portion of the second zone in FIG. 4, may only overlap the data symbol portion and not the control channel.

FIG. 4 is described as being for a transmitter with four antennas. It is to be understood that a four antenna transmitter is a particular example and not meant to limit the scope of the invention. The number of antennas in a transmitter is an implementation specific variable. In some embodiments of the invention the TDM based zone partition pattern concept can be applied to any number of antenna equal to or greater than one. In some embodiments the number of pilot symbols in a grouping in the TDM Based Zone Partition pattern is dependent on the number of antennas in the transmitter.

Figure 5:
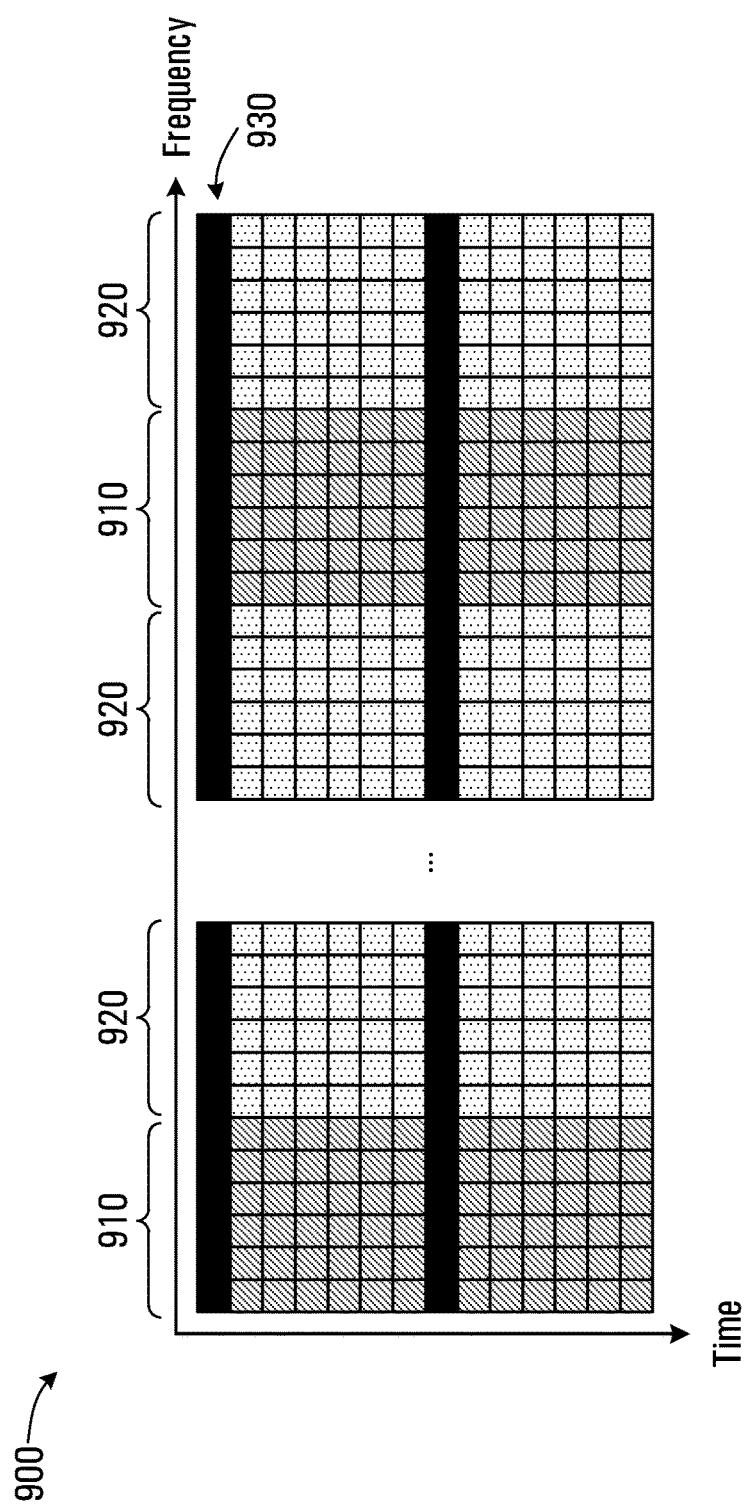
FIG. 5 is a schematic diagram of a frequency division multiplexing (FDM) Based Zone Partition arrangement for a common pilot zone and a dedicated pilot zone according to an embodiment of the invention.

FIG. 5 shows an example frequency division multiplexing (FDM) Based Zone Partition pattern 900 employed for transmitting data and pilot symbols. The FDM Based Zone Partition pattern 900 is shown having a two dimensional appearance in which the horizontal direction is frequency and the vertical direction is time. Each discrete vertical column represents a single sub-carrier. Each discrete horizontal row represents an OFDM symbol. In the example of FIG. 5, the FDM Based Zone Partition pattern 900 is formed of multiple contiguous sub-carriers assigned to multiple OFDM symbols for a zone allocated for transmission of dedicated pilot symbols and multiple contiguous sub-carriers assigned to multiple OFDM symbols for a zone allocated for transmission of dedicated pilot symbols.

In some embodiments partitioning between a zone allocated for transmission of dedicated pilot symbols and a zone allocated for transmission of dedicated pilot symbols is based on dividing a frame into multiple subcarrier portions referred to as sub-bands. In some embodiments the sub-bands each have an equal bandwidth. In some embodiments the number of sub-bands in the frame and their respective bandwidths are dynamically configurable. Once the number and bandwidth of sub-bands is set in the frame the respective bandwidths of the sub-bands remain the same until they are reconfigured.

The number of sub-bands, or blocks, in either zone is one or more. Furthermore, the number of sub-bands in different zones may or may not be equal.

A first zone 910 allocated for transmission of common pilot symbols is shown to be for OFDM beam forming transmission and a second zone 920 allocated for transmission of dedicated pilot symbols is shown to be for OFDM MIMO transmission.

In the illustrated example, FDM Based Zone Partition pattern 900 has two OFDM symbols allocated for transmission of control channel information in control channels 930. The control channel 930 is shown to occur across the first and second zones of the OFDM frame. The control channel 930 is used for transmitting information from the transmitter to the receiver pertaining to controlling the link between the transmitter and receiver. For example, the control channel may include synchronization information, DL or UL MAP information. The remainder of the symbols in each zone include data and pilots to be transmitted from the transmitter to the receiver.

In some embodiments the control channel information is transmitted in at least one transmission block of only the first zone. In some embodiments the control channel information is transmitted in at least one transmission block of only the second zone.

In some embodiments, pilot symbols, either common or dedicated, are transmitted in only an OFDM symbol containing control channel information for each zone. In some embodiments pilot symbols, common or dedicated are transmitted in only the portions of the zone containing data symbols. In some embodiments pilot symbols, common or dedicated are transmitted in both a control channel portion and the portions of the zone containing data symbols.

It is to be understood that the position of the control channel is implementation specific and is not limited to a periodic OFDM symbol spacing such as that shown in FIG. 5. While only two control channels are shown in FIG. 5, one per seven OFDM symbol duration per zone it is to be understood that in some embodiments the number of control channels is dependent upon the duration of OFDM symbols and/or the number of OFDM symbols in a frame.

FIG. 5 also shows MIMO and beam forming zones having OFDM symbol durations of the same size, alternating one after another in the frequency direction, however it is to be understood that the arrangement of the zones is implementation specific. In some implementations a multiple sub-bands may be used for one zone than for a different zone. In some embodiments the arrangement of zones is periodic in a frame. In some embodiments the arrangement of zones is not periodic, but is allocated based on the particular usage of zones by the transmitter.

In some embodiments, receivers that require a larger transmission power for both data and pilots, for example receivers that are geographically located at the edge of a communication cell, are attended to by using a different transmission zone than receivers in closer proximity to the transmitter. In some embodiments the second zone has a different transmission power for data symbols and pilot symbols than a transmission power used for data symbols and pilot symbols transmitted in the first zone.

In some embodiments an additional number of dedicated pilots may be inserted in the OFDM beam forming zones. For example, this may be advantageous in the above-described example in which the receiver is at the edge of a communication cell and extra pilots would enable a better estimate of the channel between transmitter and receiver.

In some embodiments, a pattern used for common pilot symbols in a first zone is a same pattern used for dedicated pilot symbols in a second zone.

In some embodiments common pilot symbols may be included in the blocks that have predominantly dedicated pilot symbols to allow receivers not capable of detecting the dedicated pilot symbol an opportunity to determine channel quality measurements in those blocks.

Figure 6:
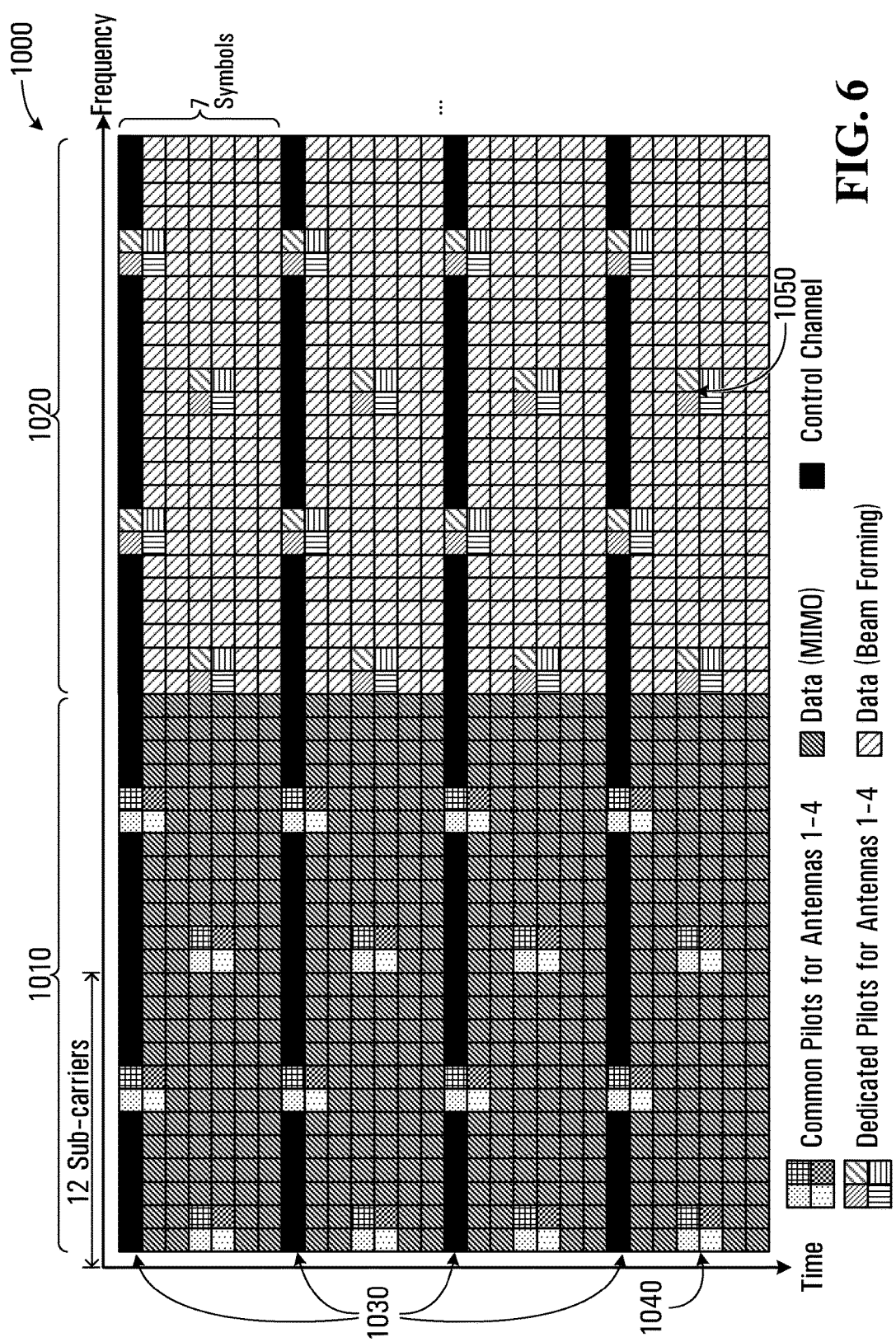
FIG. 6 is a schematic diagram of a FDM Based Zone Partition arrangement for transmission according to an embodiment for a MIMO zone and a beam forming zone.

FIG. 6 shows an example FDM Based Zone Partition pattern 1000 employed for transmitting data and pilot symbols in a transmitter with four antennas. The FDM Based Zone Partition pattern 1000 is shown having a two dimensional appearance in which the horizontal direction is frequency and the vertical direction is time. Each discrete vertical column represents a single sub-carrier. Each discrete horizontal row represents an OFDM symbol.

The example TDM Based Zone Partition pattern 1000 shows the combined data and pilot pattern for all four antennas. The patterns for each respective antenna would represent the data and pilots symbols for transmission by each respective antenna only. A grouping of pilot symbols shown in FIG. 6 would, for example be represented in a given antenna pattern by the pilot symbol for the given antenna and null symbol locations for each other antenna. The data and pilots in each zone may be intended for one or more receivers that are currently within the cell of the transmitter.

FIG. 6 illustrates an embodiment in which a first zone 1010 is for OFDM MIMO transmission and a second zone 1020 is for OFDM beam forming transmission. Beam forming in this context refers to pre-coding of OFDM MIMO (multiple input multiple output) transmissions. It is to be understood that these are examples of two transmission formats that can be used for transmitting common pilot symbols and dedicated pilot symbols, respectively and that these two transmission formats is not intended to limit the scope of the invention. For example, dedicated pilots may be used in conjunction with power control transmissions in which only one or more particular receivers are being communicated.

In FIG. 6, each zone in the FDM Based Zone Partition pattern 1000 is formed from sub-bands of twelve sub-carriers. The first zone 1010 is an OFDM MIMO transmission zone formed from two sub-bands. The second zone 1020 is an OFDM beam forming transmission zone formed from two sub-bands. More generally, the number of sub-bands per zone is implementation specific and may be more or less than the two sub-bands shown in FIG. 6. Also, the number of sub-carriers forming a sub-band is implementation specific and may be more or less than the twelve sub-carriers shown in FIG. 6. In some embodiments the number of sub-bands in the first zone may be greater than or less than the number of sub-bands in the second zone.

The sub-bands are also illustrated to be divided into durations of seven OFDM symbols in the time direction. In some embodiments, sub-bands are divided into durations having odd number of OFDM symbols per sub-band in accordance with 3GPP TR 25.814 v0.1.1 (June 2005). More generally, the number of OFDM symbols per sub-band is implementation specific and may be more or less than the seven OFDM symbols shown in FIG. 6.

In the illustrated example, FDM Based Zone Partition pattern 1000 has four OFDM symbols allocated as control channels 1030 for control channel information. The control channel is transmitted within both zones. In some embodiments the control channel information is transmitted in at least one transmission block of only the first zone. In some embodiments the control channel information is transmitted in at least one transmission block of only the second zone. It is to be understood that the position of the control channel is implementation specific and is not limited to a first OFDM symbol location in each seven OFDM symbol duration as shown in FIG. 6. While only four control channels are shown in FIG. 6 it is to be understood that in some embodiments the number of control channels is dependent upon the number of OFDM symbols per sub-band and/or the number of OFDM symbols in a frame.

In some embodiments, the control channel is located at the same location in each seven OFDM symbol duration for each zone in the FDM Based Zone Partition pattern. In some embodiments, the control channel is located in a different location in each seven OFDM symbol duration for each different zone in the FDM Based Zone Partition pattern. In some embodiments, in a same zone, but for different sub-bands, the control channel is located at a different position in the seven OFDM symbol duration.

The FDM Based Zone Partition pattern 1000 includes groupings of four pilot symbols 1040,1050, one pilot symbol for each antenna. For the first zone 1010, the OFDM MIMO zone, the grouping of pilot symbols 1040 are common pilot symbols so that any receiver can receive and detect the pilot symbols in this zone. For the second zone 1020, the OFDM beam forming zone, the pilot symbols 1050 are dedicated pilot symbols so that only receivers aware of the pre-processing technique used on the pilots utilize the dedicated pilot symbols in this zone.

The example of FIG. 6 illustrates pilot symbols that are inserted in both an OFDM symbol containing control channel information and the data symbol portion of the sub-bands in respective zones, as well as to the data symbol portion only. In some embodiments pilot information is inserted in only OFDM symbols containing control channel information for respective zone. In some embodiments pilot information is inserted in only the data symbol portions of the respective zones. In some embodiments pilot information is inserted in both OFDM symbols containing control channel information and the data symbol portions of the respective zones.

In FIG. 6, in the frequency direction there are two consecutive twelve subcarrier MIMO zone sub-bands each having a seven OFDM symbol duration followed by two consecutive twelve subcarrier beam forming zone sub-bands each having a seven OFDM symbol duration. The pattern is repeated again in the time direction with a seven OFDM symbol period. More generally, an arrangement in the frequency direction for a first zone and a second zone is implementation specific and may include of any number of sub-bands of a first zone followed by any number of sub-bands of a second zone. In some embodiments this pattern may repeat multiple times per frame. Similarly, with an arrangement in the time direction the period of the pattern is implementation specific and may include a period having any duration of OFDM symbols.

For each twelve subcarrier sub-band having a seven OFDM symbol duration, either in the MIMO zone or the beam forming zone, FIG. 6 shows two groupings of pilot symbols. The groupings of pilot symbols, both common and dedicated are shown to be a two subcarrier by two symbol duration block. It is to be understood by those skilled in the art that other patterns for the grouping of pilot symbols may be used. For example, other patterns may include a single subcarrier by four symbol duration block or a four subcarrier by single symbol duration block. In some embodiments a grouping of pilot symbols is one in which only some of the pilot symbols are directly adjacent to one another. In some embodiments a grouping of pilot symbols is one in which none of the pilot symbols are directly adjacent to one another, but are close enough together to ensure that there is time coherence and/or frequency coherence.

In some embodiments common pilot symbols may be included in the blocks that have predominantly dedicated pilot symbols to allow receivers not capable of detecting the dedicated pilot symbol an opportunity to determine channel quality measurements in those blocks.

FIG. 6 is described as being for a transmitter with four antennas. It is to be understood that a four antenna transmitter is a particular example and not meant to limit the scope of the invention. The number of antennas in a transmitter is an implementation specific variable. In some embodiments of the invention the FDM based zone partition pattern concept can be applied to any number of antenna equal to or greater than one. In some embodiments the number of pilot symbols in a grouping in the FDM Based Zone Partition patterns is dependent on the number of antennas in the transmitter.

In FIG. 6, in the first zone 1010, the groupings of common pilot symbols 1040 are inserted in a diamond lattice pattern. Similarly, in the second zone 1020, the groupings of dedicated pilot symbols 1050 are inserted using a diamond lattice pattern with a similar spacing as the pilot groups in the first zone 1010. In the illustrated example four of every seven OFDM symbols carry encoded pilot symbols, but it is to be understood that depending on how pilot symbols are inserted in the sub-bands and/or frame that the ratio of OFDM symbols having pilot symbols to OFDM symbols not having pilot symbols may vary.

In some embodiments the diamond lattice pattern in which each grouping of encoded pilot symbols, either common or dedicated is inserted within the OFDM frame is a perfect diamond lattice pattern. This can be achieve in the same manner as that described for the TDM case described above.

A different pilot pattern can be used, as long as the same pilot pattern is used for each of the pilot symbols corresponding to a particular antenna of the grouping of pilot symbols, and as long as the pilot patterns for the encoded pilot symbols are offset from each other in the time direction of the OFDM frame. For example, a regular diagonal lattice pattern may be used; the diamond shaped lattice being a special case of this.

More generally, any staggered pattern of pilot symbols can be used. In some embodiments the groupings of pilot symbols are close enough together to ensure that there is time coherence and/or frequency coherence. Time coherence occurs when pilot symbols in the time direction are close enough in proximity that channel characteristics are substantially the same at the two points in time within an acceptable tolerance. Frequency coherence occurs when pilot symbols in the frequency direction are close enough in proximity that channel characteristics are substantially the same at two sub-carriers within an acceptable tolerance.

In some embodiments the respective pilot patterns that are used in the zone containing common pilot symbols and the zone containing dedicated pilot symbols are different pilot patterns.

Figure 7:
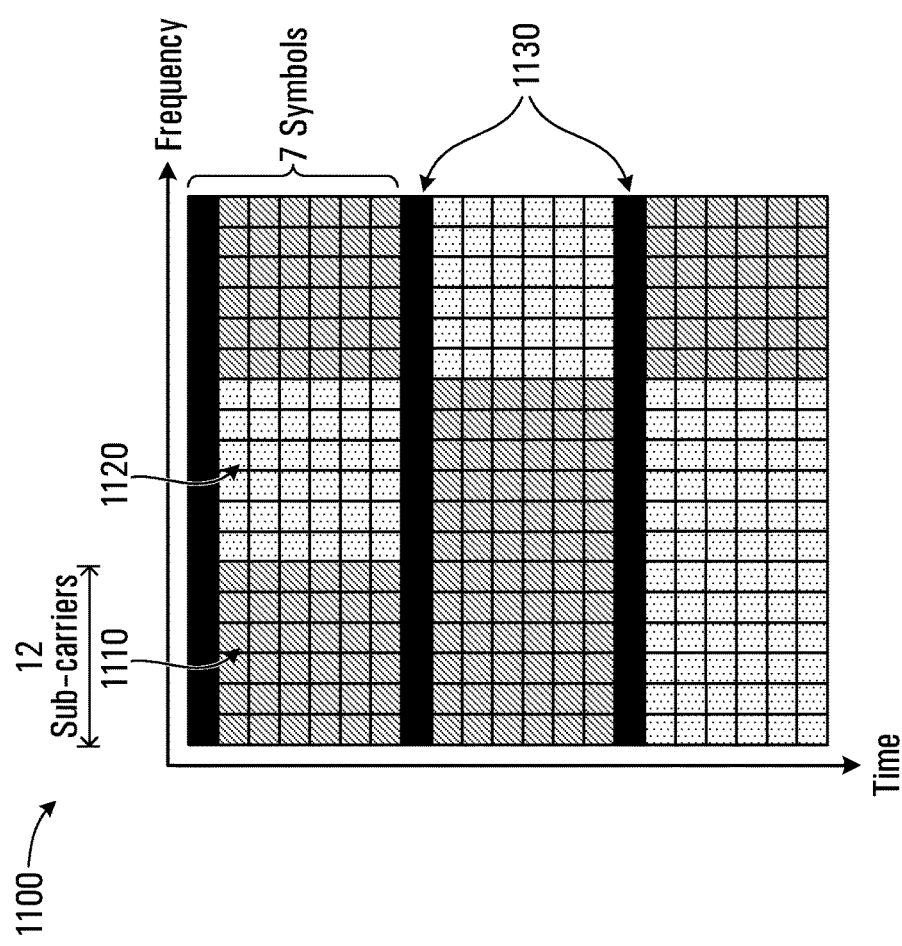
FIG. 7 is a schematic diagram of a combined TDM/FDM Based Zone Partition arrangement for a common pilot zone and a dedicated pilot zone according to an embodiment.

While FIGS. 2 and 5 have generally been used to describe TDM Based Zone Partition patterns and FDM Based Zone Partition patterns respectively, it is to be understood that in some embodiments a combined TDM/FDM Based Zone Partition pattern is also considered to be within the scope of the invention. In some embodiments a zone is allocated the entire frequency spectrum allocated for transmission, as shown in FIG. 2. In some embodiments a zone allocated for transmission of common pilot symbols is allocated at least one sub-band of the frequency spectrum, allowing a zone allocated for transmission of dedicated pilot symbols to utilize unused sub-bands of the frequency spectrum, as shown in FIG. 5. FIG. 7 illustrates an example of a combined TDM/FDM Based Zone Partition pattern 1100 for transmitting data and pilot symbols in a transmitter with four antennas. However, the particular pattern of FIG. 7 is not meant to limit the scope of the invention to only four antennas. In some embodiments of the invention the TDM/FDM based zone partition pattern concept can be applied to any number of antenna.

The combined TDM/FDM Based Zone Partition pattern 1100 is shown having a two dimensional appearance in which the horizontal direction is frequency and the vertical direction is time. Each discrete vertical column represents a single sub-carrier. Each discrete horizontal row represents an OFDM symbol.

In FIG. 7, combined TDM/FDM Based Zone Partition pattern 1100 is comprised of nine discrete time-frequency blocks in a three by three matrix that are either a first zone 1110 or a second zone 1120. The blocks each have a sub-band of six sub-carriers and a TTI of seven symbols. In a first sub-band, two transmission blocks of a first zone in the time direction are followed by a third block that is a transmission block of a second zone. In a second sub-band, first and third blocks in the time direction are for transmission of a second zone and a second block is for transmission of a first zone. In a third sub-band, first and third blocks in the time direction are for transmission of a first zone and a second block is for transmission of a second zone.

More generally, the number of sub-carriers in a sub-band of the block and OFDM symbols in a TTI of the block are implementation specific and may be more or less than the twelve sub-carriers and/or seven OFDM symbols shown in FIG. 7. Furthermore, the allocation of respective zones in the combined TDM/FDM Based Zone Partition pattern is implementation specific. In some embodiments the respective zone may have a repeating pattern in the frame. In other embodiments the respective zone fill a frame without a repeating pattern. In some embodiments, the number of OFDM symbols in each block comprise an odd number of OFDM symbols per zone in accordance with 3GPP TR 25.814 v0.1.1 (June 2005).

TDM/FDM Based Zone Partition pattern 1100 has three OFDM symbols allocated as control channels 1130. Each control channel occurs across the three sub-bands at a same OFDM symbol location in each respective block. While only three control channels are shown in FIG. 7 it is to be understood that in some embodiments the number of control channels is dependent upon duration of OFDM symbols per block and/or the number of blocks in a frame.

In some embodiments pilot information is transmitted in only OFDM symbols containing control channel information for each zone. In some embodiments pilot information is transmitted in only the portions of the zone containing data symbols. In some embodiments pilot information is transmitted in both OFDM symbols containing control channel information and the portions of the zone containing data symbols.

In some embodiments the first and second zones are an OFDM MIMO zone and an OFDM beam forming zone, respectively. However, it is to be understood that this is an example of two zones and that this example is not intended to limit the scope of the invention.

Figure 8:
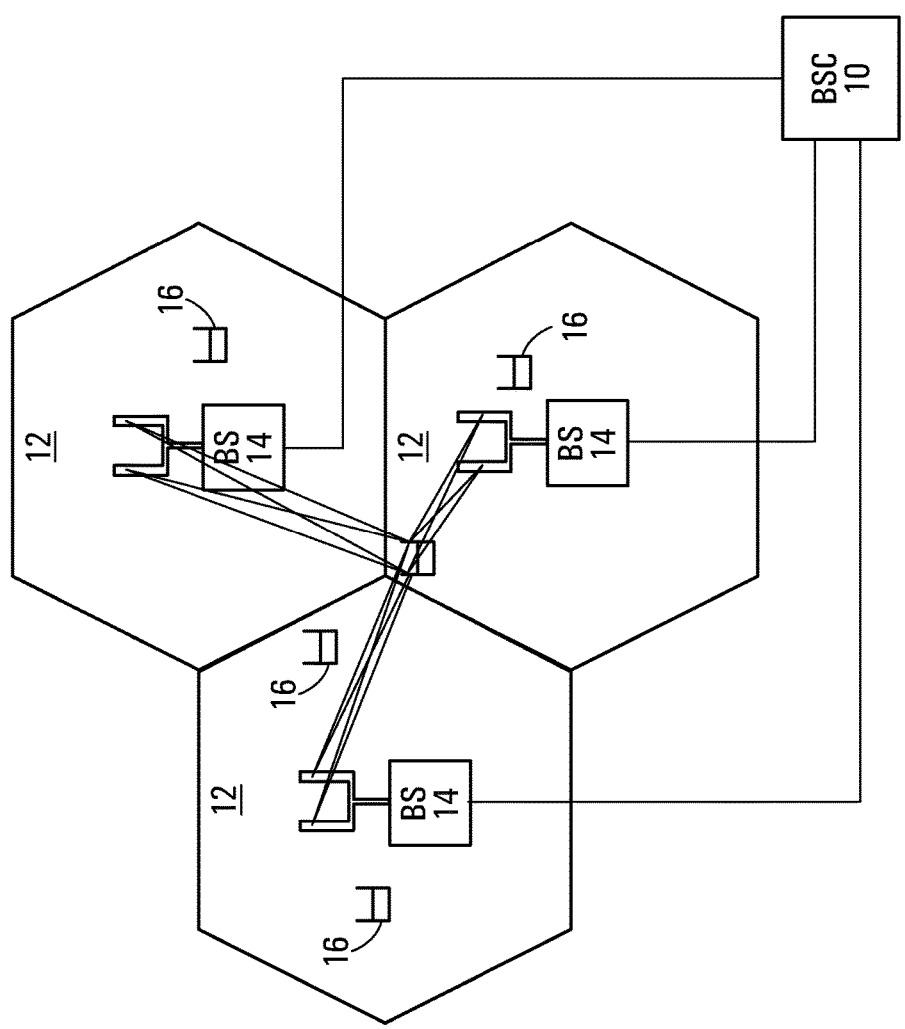
FIG. 8 is a block diagram of a cellular communication system.

For the purposes of providing context for embodiments of the invention for use in a communication system, FIG. 8 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 9:
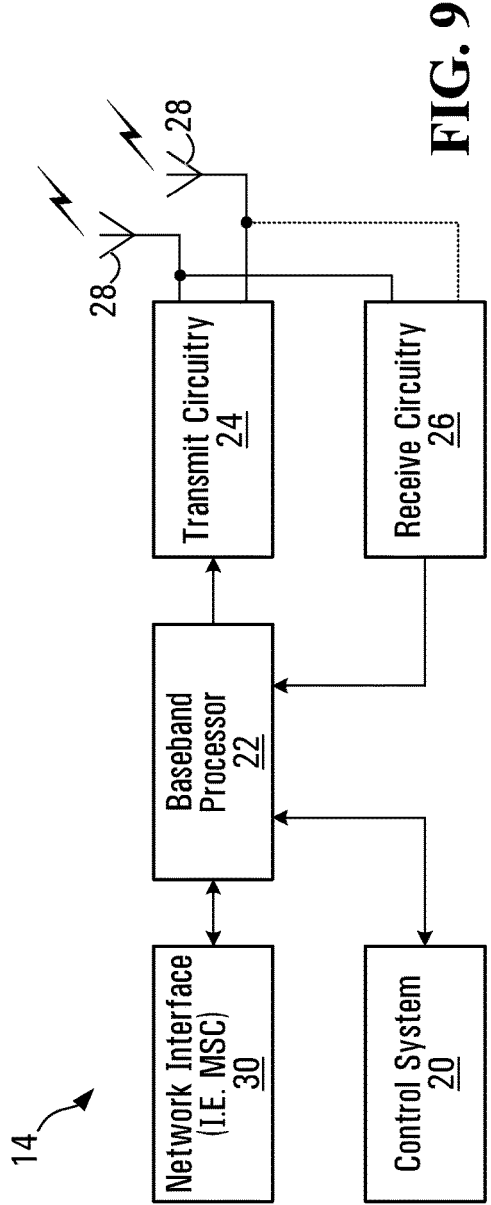
FIG. 9 is a block diagram of an example base station that might be used to implement some embodiments of the present invention.

A high level overview of the mobile terminals 16 and base stations 14 upon which aspects of the present invention may be implemented is provided below. With reference to FIG. 9, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 8). A low noise amplifier and a filter (not shown) may cooperate to amplify and remove broadband interference from the signal for processing. Down-conversion and digitization circuitry (not shown) will then down-convert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 10:
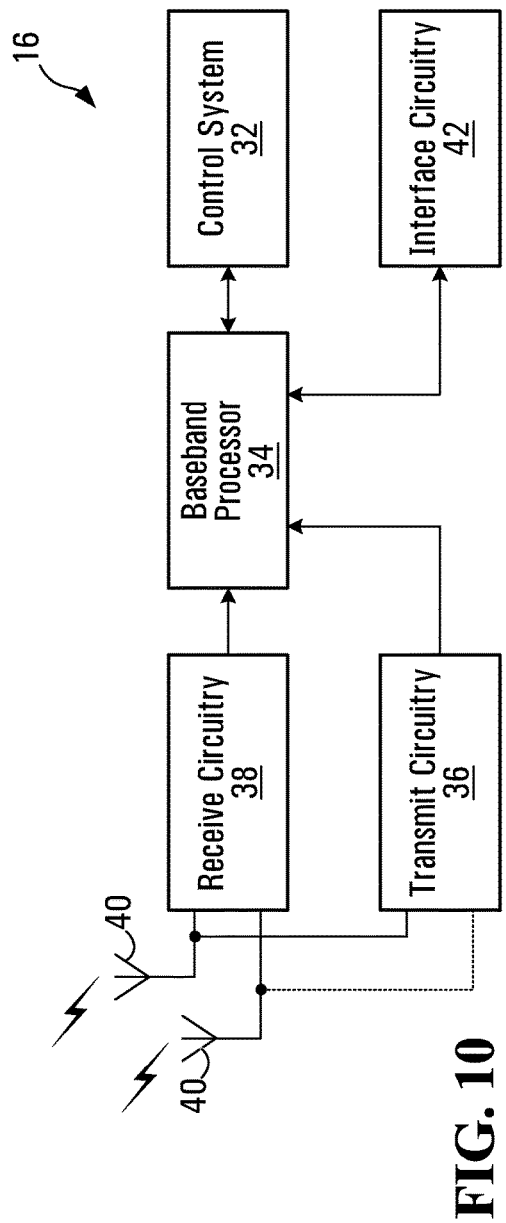
FIG. 10 is a block diagram of an example wireless terminal that might be used to implement some embodiments of the present invention.

With reference to FIG. 10, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Down-conversion and digitization circuitry (not shown) will then down-convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 11:
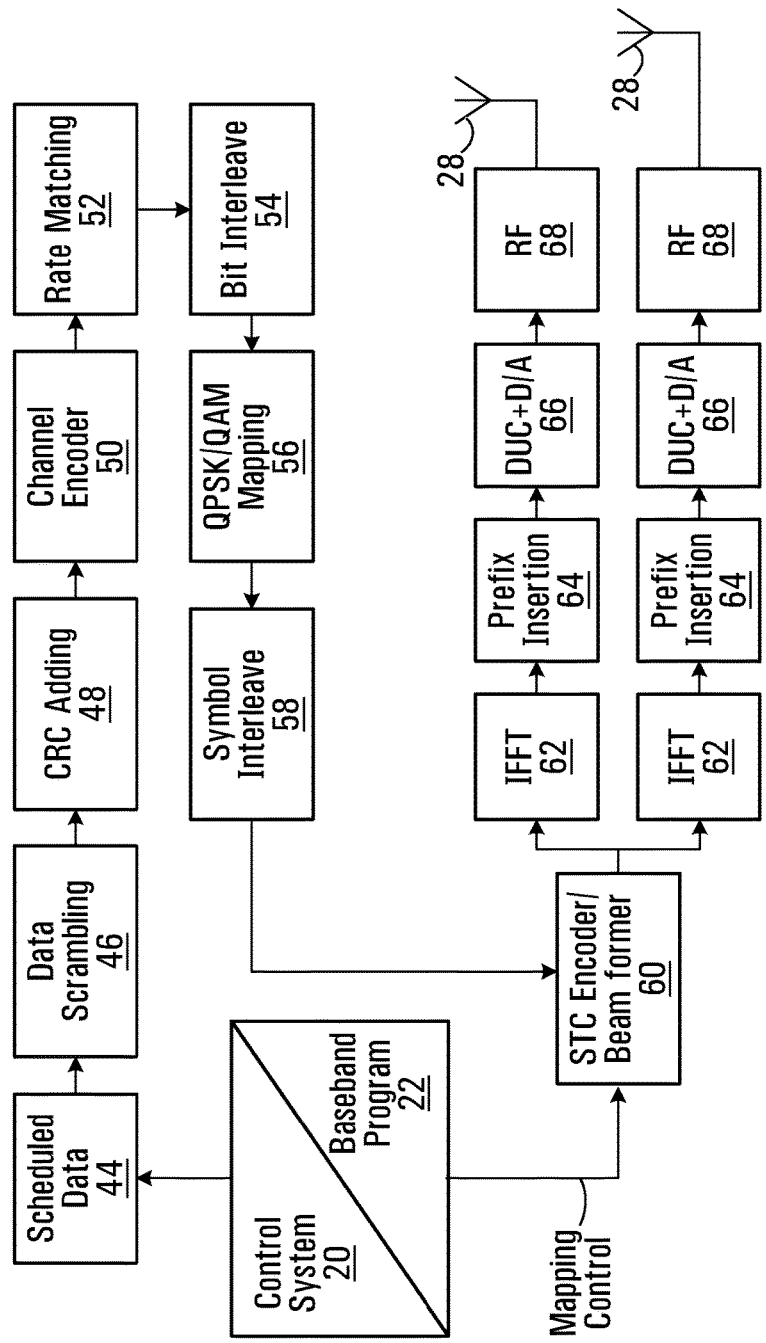
FIG. 11 is a block diagram of a logical breakdown of an example OFDM transmitter architecture that might be used to implement some embodiments of the present invention.

With reference to FIG. 11, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. In some embodiments the STC encoder logic 60 encodes the data to be sent in the common pilot symbol zone using open-loop MIMO. In some embodiments this may involve creation of a pre-processing matrix that is consistent with open-loop MIMO. For example, such a pre-processing matrix may be the identity matrix, which would effectively result in the appearance of no pre-processing being performed. In some embodiments as a part of inserting data and common pilot symbols in the second zone, the STC encoder logic 60 creates a pre-processing matrix that is consistent with closed loop MIMO, such as beam forming for encoding the data and pilot symbols to be sent in the common pilot symbol zone.

While STC encoder logic 60 is shown as a single bock in FIG. 11, it is to be understood that the processes of partitioning OFDM frames, allocating the first and second zones, and inserting data and common pilot symbols in the first zone and data and dedicated pilot symbols in the second zone may be represented by separate logic blocks.

The STC encoder logic 60 will process the incoming symbols and provide "n" outputs corresponding to the number of transmit antennas 28 for the base station 14. The control system 20 and/or baseband processor 22 as described above with respect to FIG. 9 will provide a mapping control signal to control STC encoding. At this point, assume the symbols for the "n" outputs are representative of the data to be transmitted and capable of being recovered by the mobile terminal 16.

In some embodiments, the control system 20 and/or baseband processor 22 will send a mapping control signal that defines the partition of OFDM frames for N transmission antennas, defines the allocation of first and second zones in the respective OFDM frames, and controls insertion of a two dimensional array of data and common pilot symbols in time-frequency in the first zone for transmission of common pilot symbols and insertion of a two dimensional array of data and dedicated pilot symbols in time-frequency in the second zone for transmission of dedicated pilot symbols.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 12:
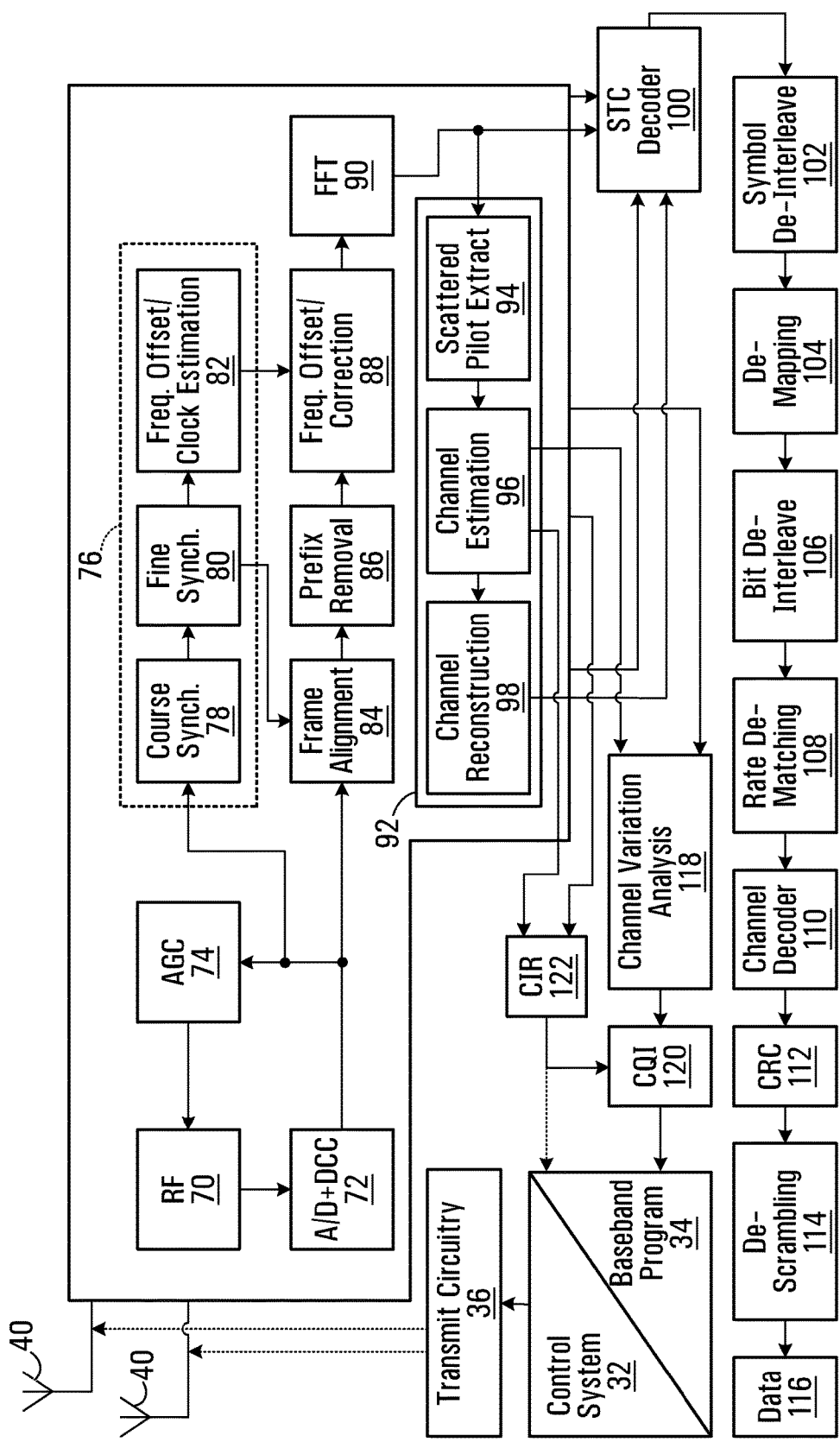
FIG. 12 is a block diagram of a logical breakdown of an example OFDM receiver architecture that might be used to implement some embodiments of the present invention.

Reference is now made to FIG. 12 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and down-converts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 12, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI 120, or at least information sufficient to create a CQI 120 at the base station 14, is determined and transmitted to the base station 14. As noted above, the CQI 120 may be a function of the carrier-to-interference ratio (CIR 122), as well as the degree to which the channel response varies across the various sub-carriers in the OFDM frequency band. Such variation can be determined by channel variation analysis 118. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band used to transmit data.

FIGS. 7 to 12 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of embodiments as described herein.

Numerous modifications and variations of the present invention are possible in light of the above teachings. It is therefore to be understood that within the scope of the appended claims, the invention may be practiced otherwise than as specifically described herein.

What is claimed is:

1. An apparatus, comprising:
   a baseband processor; and
   a memory having stored thereon program instructions executable by the baseband processor;
   wherein the baseband processor is configured to:
      process at least a portion of a signal received via a wireless channel, wherein the signal includes:
         a plurality of successive Orthogonal Frequency Division Multiplexing (OFDM) symbols grouped into a plurality of transmission time intervals (TTI);
         a plurality of successive blocks, wherein each block consists of twelve (12) sub-carriers over one of the plurality of transmission time intervals, wherein one or more respective ones of the TTIs include control information in one or more beginning symbols of the TTI;
         dedicated pilot symbols for four antennas inserted in a pre-defined time-frequency pattern across one or more of the plurality of successive blocks, wherein the dedicated pilots for the four antennas, collectively, are mapped to a two-subcarrier by two-OFDM symbol contiguous cluster, wherein the cluster is inserted in a plurality of scattered locations in each block according to the pre-defined time-frequency pattern, and wherein the dedicated pilot symbols are beamformed to the apparatus on each of the one or more of the plurality of successive blocks; and
         data symbols inserted in the one or more of the plurality of successive blocks; and
      process the dedicated pilot symbols as part of data symbol reception.

2. The apparatus of claim 1, wherein the baseband processor is further configured to process common pilot symbols that are included in ones of the plurality of successive blocks.

3. The apparatus of claim 1, wherein common pilot symbols are included in at least the control information of the one or more of the plurality of successive blocks.

4. The apparatus of claim 1, wherein at least one of the plurality of successive blocks uses a first multiple input multiple output (MIMO) format and at least one other block uses a second MIMO format that is different than the first MIMO format.

5. The apparatus of claim 1, wherein the apparatus is configured to process the at least a portion of the signal based on knowledge of a beamforming pre-processing technique applied to the dedicated pilot symbols.

6. The apparatus of claim 2, wherein the common pilot symbols and the dedicated pilot symbols have different transmission power.

7. A non-transitory computer-readable medium having instructions stored thereon that are executable by a computing device to perform operations comprising:
processing at least a portion of a signal received via a wireless channel, wherein the signal includes:
a plurality of successive Orthogonal Frequency Division Multiplexing (OFDM) symbols grouped into a plurality of transmission time intervals (TTI);
a plurality of successive blocks, wherein each block consists of twelve (12) sub-carriers over one of the plurality of transmission time intervals, wherein one or more respective ones of the TTIs include control information in one or more beginning symbols of the TTI;
dedicated pilot symbols for four antennas inserted in a pre-defined time-frequency pattern across one or more of the plurality of successive blocks, wherein the dedicated pilots for the four antennas, collectively, are mapped to a two-subcarrier by two-OFDM symbol contiguous cluster, wherein the cluster is inserted in a plurality of scattered locations in each block according to the pre-defined time-frequency pattern, and wherein the dedicated pilot symbols are beamformed to the computing device on each of the one or more of the plurality of successive blocks; and
data symbols inserted in the one or more of the plurality of successive blocks; and
processing the dedicated pilot symbols as part of data symbol reception; and
demodulating data included in the received signal based on the dedicated pilot symbols.

8. The non-transitory computer-readable medium of claim 7, wherein the operations further comprise: processing common pilot symbols that are included in ones of the plurality of successive blocks.

9. The non-transitory computer-readable medium of claim 7, wherein common pilot symbols are included in at least the control information of the one or more of the plurality of successive blocks.

10. The non-transitory computer-readable medium of claim 7, wherein at least one of the plurality of successive blocks uses a first multiple input multiple output (MIMO) format and at least one other block uses a second MIMO format that is different than the first MIMO format.

11. The non-transitory computer-readable medium of claim 7, wherein the operations further comprise processing the at least a portion of the signal based on knowledge of a beamforming pre-processing technique applied to the dedicated pilot symbols.

12. The non-transitory computer-readable medium of claim 8, wherein the common pilot symbols and the dedicated pilot symbols have different transmission power.

13. A method, comprising:
generating a signal for wireless transmission; and
transmitting the signal via a wireless channel, wherein the signal includes:
a plurality of successive Orthogonal Frequency Division Multiplexing (OFDM) symbols grouped into a plurality of transmission time intervals (TTI);
a plurality of successive blocks, wherein each block consists of twelve (12) sub-carriers over one of the plurality of transmission time intervals, wherein one or more respective ones of the TTIs include control information in one or more beginning symbols of the TTI;
dedicated pilot symbols for four antennas inserted in a pre-defined time-frequency pattern across one or more of the plurality of successive blocks, wherein the dedicated pilots for the four antennas, collectively, are mapped to a two-subcarrier by two-OFDM symbol contiguous cluster, wherein the cluster is inserted in a plurality of scattered locations in each block according to the pre-defined time-frequency pattern, and wherein the dedicated pilot symbols are beamformed to a receiving device on each of the one or more of the plurality of successive blocks; and
data symbols inserted in the one or more of the plurality of successive blocks;
wherein the dedicated pilot symbols are usable as part of data symbol reception.

14. The method of claim 13, wherein common pilot symbols are included in ones of the plurality of successive blocks.

15. The method of claim 13, wherein at least one of the plurality of successive blocks has a first multiple input multiple output (MIMO) format and at least one other block has a second MIMO format that is different than the first MIMO format.

16. The method of claim 13, further comprising transmitting, to one or more receiving devices, information indicating a beamforming pre-processing technique applied to the dedicated pilot symbols.

17. The method of claim 14, further comprising transmitting the common pilot symbols and dedicated pilot symbols using different transmission power.

18. The method of claim 14, wherein the common pilot symbols are included in at least the control information of the one or more of the plurality of successive blocks.

* * * * *